United States Patent
Holmes

(10) Patent No.: US 8,908,276 B2
(45) Date of Patent: Dec. 9, 2014

(54) MOIRE MAGNIFICATION DEVICE

(75) Inventor: Brian William Holmes, Fleet (GB)

(73) Assignee: De La Rue International Limited, Hampshire (GB)

( * ) Notice: Subject to any disclaimer, the term of this patent is extended or adjusted under 35 U.S.C. 154(b) by 209 days.

(21) Appl. No.: 13/580,837

(22) PCT Filed: Mar. 1, 2011

(86) PCT No.: PCT/GB2011/050404
§ 371 (c)(1),
(2), (4) Date: Oct. 24, 2012

(87) PCT Pub. No.: WO2011/107788
PCT Pub. Date: Sep. 9, 2011

(65) Prior Publication Data
US 2013/0038942 A1   Feb. 14, 2013

(30) Foreign Application Priority Data

Mar. 1, 2010   (GB) .................................. 1003397.5

(51) Int. Cl.
| | |
|---|---|
| *G02B 27/10* | (2006.01) |
| *G07D 7/00* | (2006.01) |
| *B42D 15/00* | (2006.01) |
| *G07D 7/20* | (2006.01) |
| *G02B 3/00* | (2006.01) |

(52) U.S. Cl.
CPC ............. *G07D 7/0006* (2013.01); *B42D 15/002* (2013.01); *G07D 7/2066* (2013.01); *B42D 2035/20* (2013.01); *B42D 2035/44* (2013.01); *G02B 3/0056* (2013.01)
USPC ........................................................ 359/618

(58) Field of Classification Search
USPC ................................................ 359/618, 619
See application file for complete search history.

(56) References Cited

U.S. PATENT DOCUMENTS

| | | | |
|---|---|---|---|
| 4,652,015 | A | 3/1987 | Crane |
| 5,694,229 | A | 12/1997 | Drinkwater et al. |

(Continued)

FOREIGN PATENT DOCUMENTS

| | | |
|---|---|---|
| AU | 734 937 B2 | 6/2001 |
| CA | 2 581 142 A1 | 3/2006 |

(Continued)

OTHER PUBLICATIONS

Oct. 29, 2013 Office Action issued in Japanese Patent Application No. 2012-555490 (with translation).

(Continued)

*Primary Examiner* — James Jones
(74) *Attorney, Agent, or Firm* — Oliff PLC

(57) ABSTRACT

A moiré magnification device includes a transparent substrate carrying: a regular array of micro-focusing elements, that define a focal plane, on a first surface; a corresponding first array of microimage elements in a first color located in a plane substantially coincident with the focal plane; and a corresponding second array of microimage elements, in a second color, located in a plane substantially coincident with the focal plane. The pitches of the micro-focusing elements and first and second arrays and their relative locations are such that the array of micro-focusing elements cooperates with each of the first and second arrays to generate magnified versions of the microimage elements due to the moiré effect. The magnified version of the first array is viewed against a background defined by the magnified version of the second array, the first array exhibiting movement relative to the background when the device is tilted.

27 Claims, 20 Drawing Sheets

(56) References Cited

U.S. PATENT DOCUMENTS

| | | |
|---|---|---|
| 6,508,489 B2 | 1/2003 | Herrmann et al. |
| 2004/0084893 A1 | 5/2004 | Fan et al. |
| 2007/0075150 A1 | 4/2007 | Luthi et al. |
| 2008/0067801 A1 | 3/2008 | Schilling et al. |
| 2008/0284157 A1 | 11/2008 | Muke et al. |
| 2009/0102605 A1 | 4/2009 | Kaule |
| 2009/0297805 A1 | 12/2009 | Dichtl |
| 2010/0177094 A1 | 7/2010 | Kaule et al. |
| 2011/0109078 A1 | 5/2011 | Hoffmuller et al. |
| 2012/0274998 A1* | 11/2012 | Holmes et al. ............ 359/2 |

FOREIGN PATENT DOCUMENTS

| | | |
|---|---|---|
| DE | 10 2004 056 553 A1 | 5/2006 |
| DE | 10 2007 029 204 A1 | 1/2009 |
| DE | 10 2008 029 638 A1 | 12/2009 |
| EP | 0 059 056 A1 | 9/1982 |
| EP | 0 279 526 A2 | 8/1988 |
| EP | 0 723 501 B1 | 7/1996 |
| EP | 0 724 519 B1 | 8/1996 |
| EP | 0 860 298 A2 | 8/1998 |
| EP | 1 398 174 A1 | 3/2004 |
| EP | 1 897 700 A2 | 3/2008 |
| GB | 1 407 065 | 9/1975 |
| JP | A-2001-26175 | 1/2001 |
| JP | A-2004-317636 | 11/2004 |
| JP | A-2008-513816 | 5/2008 |
| JP | A-2009-086210 | 4/2009 |
| JP | A-2009-536885 | 10/2009 |
| JP | A-2009-541873 | 11/2009 |
| JP | A-2009-543138 | 12/2009 |
| WO | WO 83/00659 A1 | 3/1983 |
| WO | WO 94/27254 | 11/1994 |
| WO | WO 00/39391 A1 | 7/2000 |
| WO | WO 01/23943 A1 | 4/2001 |
| WO | WO 03/054297 A2 | 7/2003 |
| WO | WO 03/091952 A2 | 11/2003 |
| WO | WO 03/091953 A2 | 11/2003 |
| WO | WO 03/095188 A2 | 11/2003 |
| WO | WO 2005/052650 A2 | 6/2005 |
| WO | WO 2005/106601 A2 | 11/2005 |
| WO | WO 2006/125224 A2 | 11/2006 |
| WO | WO 2007/133613 A2 | 11/2007 |
| WO | WO 2008/000351 A2 | 1/2008 |
| WO | WO 2008/008635 A2 | 1/2008 |
| WO | WO 2009/121578 A2 | 10/2009 |
| WO | WO 2009/139396 A1 | 11/2009 |
| WO | WO 2009/156079 A1 | 12/2009 |

OTHER PUBLICATIONS

Oct. 29, 2013 Office Action issued in Japanese Patent Application No. 2012-555491 (with translation).

Hutley et al., "The Moire Magnifier", Pure Appl. Opt. 3 (1994) pp. 133-142 published by IOP Publishing Limited.

Jun. 27, 2011 International Search Report issued in International Application No. PCT/GB2011/050407.

Jun. 7, 2011 International Search Report issued in International Application No. PCT/GB2011/050399.

Jun. 10, 2011 International Search Report issued in International Application No. PCT/GB2011/050398.

Jun. 30, 2011 International Search Report issued in International Application No. PCT/GB2011/050404.

U.S. Appl. No. 13/580,730, filed in the name of Holmes, Oct. 24, 2012.

U.S. Appl. No. 13/580,784, filed in the name of Holmes, Oct. 19, 2012.

U.S. Appl. No. 13/580,797, filed in the name of Holmes, Oct. 24, 2012.

Sep. 29, 2014 Office Action issued in U.S. Appl. No. 13/580,784.

* cited by examiner

Fig.2D.
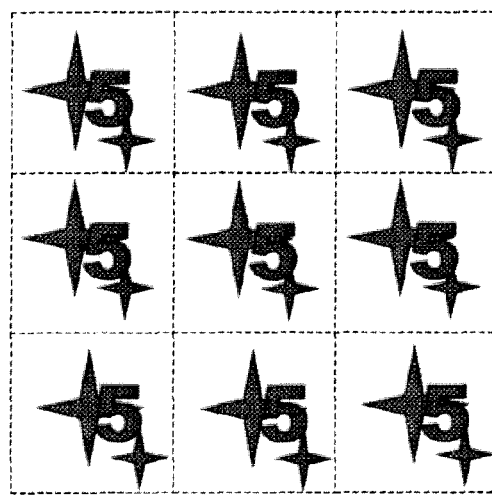
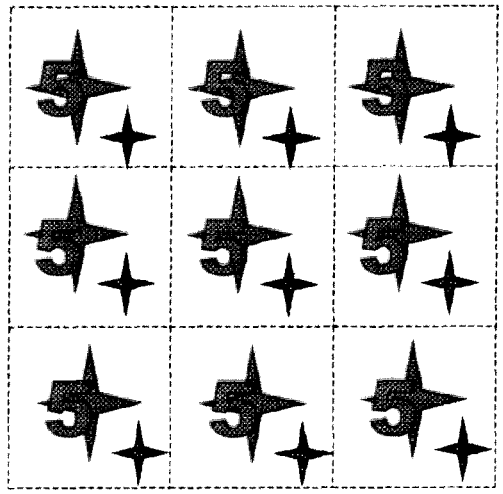
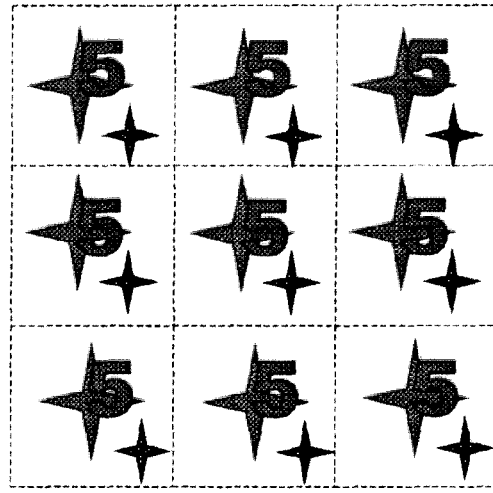

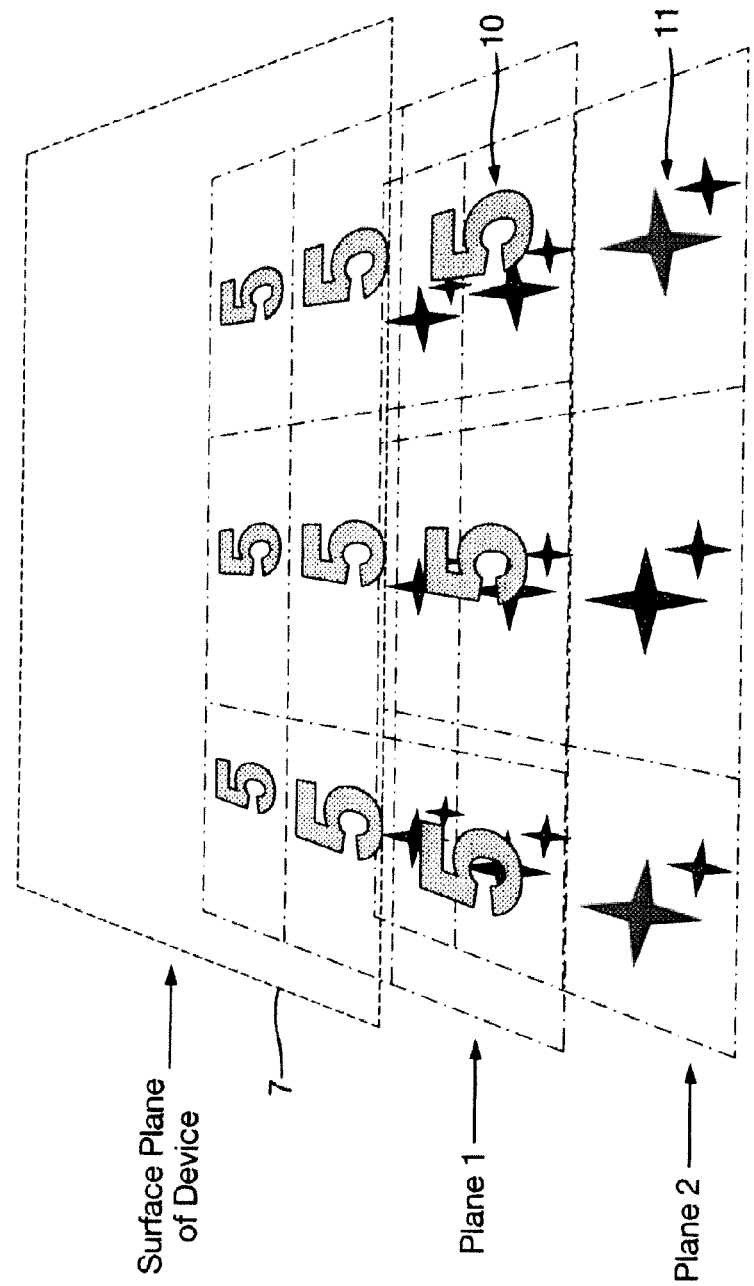

Micro-image Unit
Cell For Plane 1

Micro-image Unit
Cell For Plane 2

Fig.5.
"5"'s Located in Plane 1
Repeating Circle Pattern Located in Plane 2
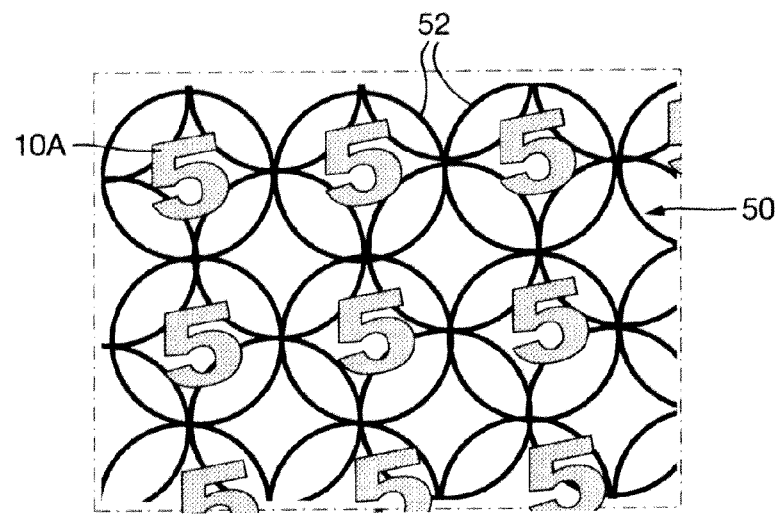
Fig.6A. Micro-image Unit Cell For Plane 2
Fig.6B.
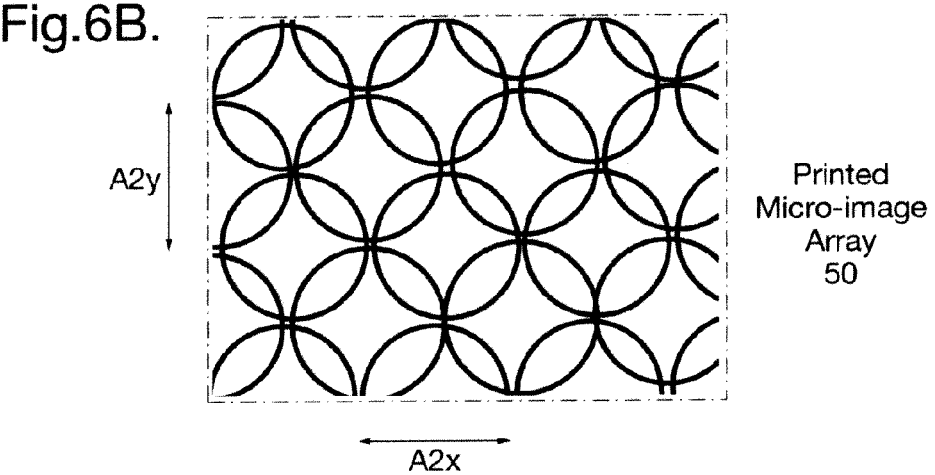
Printed Micro-image Array 50

53A

Micro-image Unit
Cell For Plane 1

62A

Micro-image Unit
Cell For Plane 2

50

52

A1x

A1y

60

62

A2x

A2y

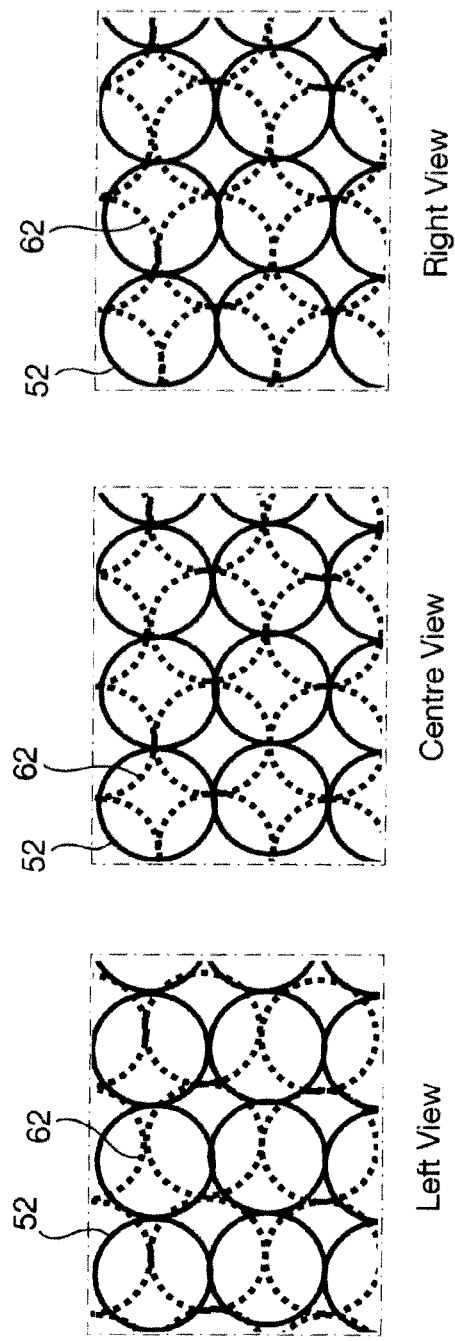

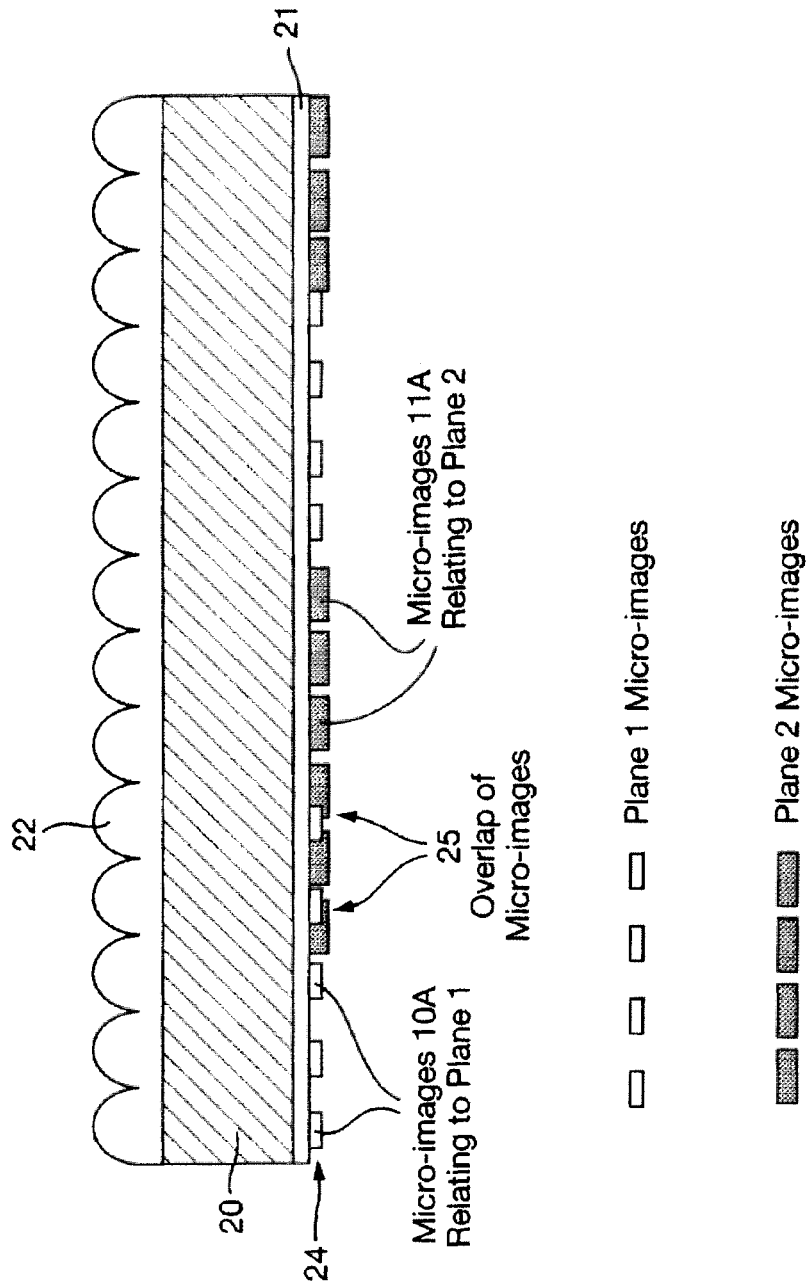

☐ ☐ ☐ ☐ Layer 1 Micro-images

▨ ▨ ▨ ▨ Layer 2 Micro-images

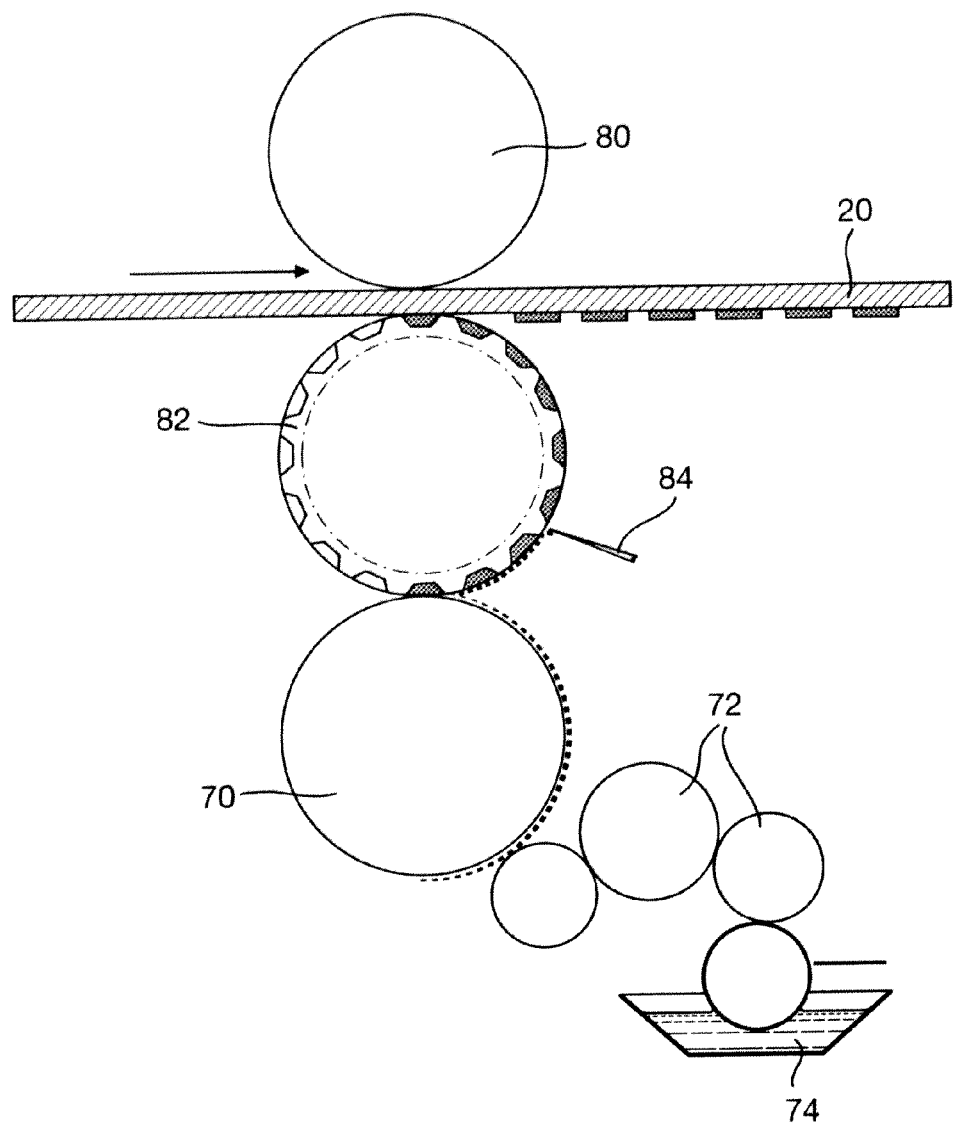

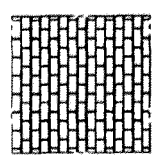
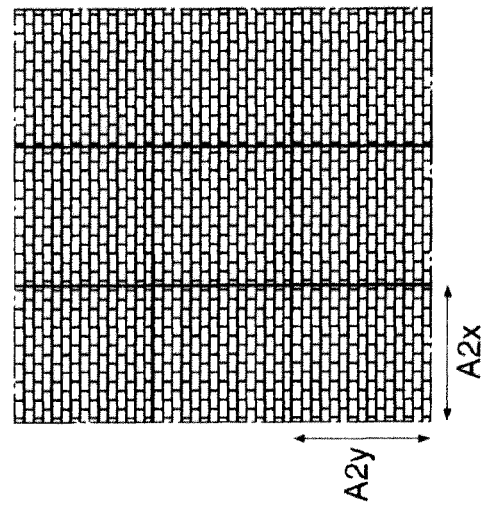
Fig. 18.
Micro-image Unit Cell Background Patten
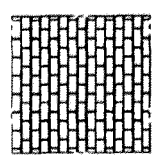
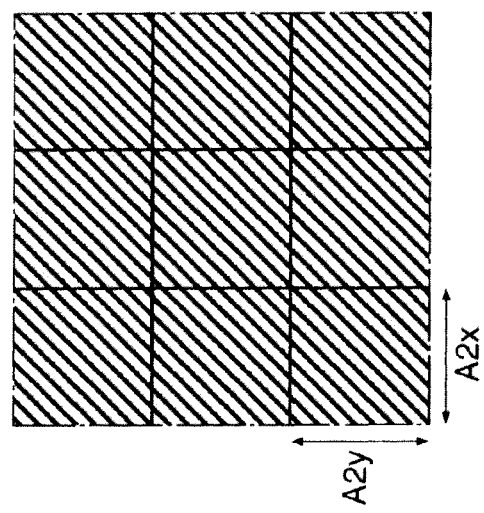
Fig. 19.

MOIRE MAGNIFICATION DEVICE

The invention relates to a moiré magnification device such as a security device, for example for use on security documents and other articles of value such as banknotes, cheques, passports, identity cards, certificates of authenticity, fiscal stamps and other documents for securing value or personal identity. It also relates to optical devices for use on packaging or the like.

Moiré magnification has been used as the basis of security devices for a number of years. A number of examples are described in WO-A-94/27254 and EP-A-1695121. In such a device, a regular array of micro-focusing elements defining a focal plane is provided over a corresponding array of image elements located in a plane substantially aligned with the focal plane of the focusing elements. The pitch or periodicity of the array of image elements is chosen to differ by a small factor from the pitch or periodicity of the focusing elements and this mismatch means that magnified versions of the image elements are generated.

The magnification factor depends upon the difference between the periodicities or pitches. A pitch mismatch between a microlens array and a microimage array can also conveniently be generated by rotating the microimage array relative to the microlens array or vice-versa, such that the microlens array and microimage array have a rotational misalignment. The rotational misalignment or the small pitch mismatch results in the eye observing a different part of the image in each neighbouring lens resulting in a magnified image. If the eye is then moved relative to the lens/image array a different part of the image is observed giving the impression that the image is in a different position. If the eye is moved in a smooth manner a series of images are observed giving rise to the impression that the image is moving relative to the surface. In the case where the pitch mismatch is generated by rotational misalignment the array of magnified images is rotated relative to the microimage array and consequently the parallax affect that results in the apparent movement of the magnified image is also rotated and this is known as skew parallax. The effect of pitch mismatch and rotational misalignment on the magnification and rotation of the magnified image observed in a moiré magnifier is described in "The Moiré Magnifier", M. Hutley, R Hunt, R F Stevens and P Savander, Pure Appl. Opt. 3 (1994) 133-142 published by IOP Publishing Limited.

The nature of the movement and orientation changes can be explained from the theory of moiré; this is discussed in detail in "The theory of the Moiré phenomenon" by I. Amidror published by Kluiver Academic Publishers in 2000, ISBN 0-7923-5949-6. The moiré effect of two periodic structures can be explained/predicted by considering the frequency vectors of the two structures. The orientation of the frequency vector represents the direction of the periodicity and the length represents the frequency (i.e. 1/Period). The vector is expressed by its Cartesian coordinates (u,v) where u and v are the horizontal and vertical components of the frequency.

The principles involved are discussed in more detail in WO-A-2005/106601.

Typically, the focusing elements comprise microlenses or micromirrors and the image elements are defined by simple icons or the like.

It is also known to provide multiple images in a moiré magnifying device. For example, WO-A-94/27254 illustrates an image switch effect on tilting a device. WO-A-2005/106601 describes how two magnified image sets can be caused to move at different rates as the device is tilted. Another example is described in WO-A-2009/139396.

The problem with the known devices, however, is that it is very difficult to achieve multicolour effects in which two or more images are obtained in different colours. This is primarily because the difficulty of printing two microimage arrays in mutual register with one another but in different colours since this would require separate print runs.

In accordance with the present invention, a moiré magnification device comprises a transparent substrate carrying:
  i) a regular array of micro-focusing elements on a first surface, the focusing elements defining a focal plane;
  ii) a corresponding first array of microimage elements in a first colour and located in a plane substantially coincident with the focal plane of the focusing elements; and,
  iii) a corresponding second array of microimage elements, in a second colour different from the first colour, and located in a plane substantially coincident with the focal plane of the focusing elements, wherein the pitches of the micro-focusing elements and first and second arrays of microimage elements and their relative locations are such that the array of micro-focusing elements cooperates with each of the first and second arrays of microimage elements to generate respective magnified versions of the microimage elements of each array due to the moiré effect and such that the magnified version of the first array of microimage elements is viewed against a background defined by the magnified version of the second array of microimage elements, the magnified version of the first array of microimage elements exhibiting movement relative to the background when the device is tilted, and wherein the pitch mismatch between the arrays is chosen such that the magnified version of the elements of the first array appears above or below the magnified version of the elements of the second array.

We have realised that it is possible to obtain multi-coloured images in a moiré magnification device by arranging the microimage arrays such that the resultant magnified versions of the arrays appear at different depths or in different planes when viewed. This avoids the need for mutual registration.

By suitably choosing the pitch mismatch between the arrays, the first array can appear above or below the second array.

One or more further arrays of respective microimage elements in other colours could be provided. For example, in a particularly preferred approach, the device further comprises
  iv) a corresponding third array of microimage elements, in a third colour different from the first and second colours, and located in the plane substantially coincident (to make consistent with II and III) with the focal plane of the micro-focusing elements, wherein the pitches of the micro-focusing elements and third array of microimage elements are such that they cooperate to generate a magnified version of the image elements of the third array due to the moiré effect and such that the magnified version of the first array of microimage elements is viewed against a background defined by the magnified versions of the second and third arrays of microimage elements, the magnified version of the first array of microimage elements exhibiting movement relative to the background when the device is tilted.

The provision of a third array of, typically identical, microimage elements allows the magnified image elements of each array to appear at different depths relative to each other depending upon the pitches of each array. Thus, in one example, the pitches of the array of micro-focusing elements and the first, second and third arrays of microimage elements are chosen such that the magnified version of the first array of microimage elements appears between the magnified versions of the microimage elements of the second and third arrays.

In another example, the pitches of the array of focusing elements and first, second and third arrays of microimage elements are chosen so the magnified version of the image elements of the first array appear above the magnified versions of the image elements of the second and third arrays.

The microimage elements of at least the first and third arrays may be identical or may morph gradually across the array.

As mentioned above, the invention is particularly advantageous where the background defining the array(s) does not have to be registered with the first array and this can be particularly easily achieved if the background arrays define a respective generic background, for example a line pattern, simple geometric figures, or more complex line structures such as guilloche patterns.

In some cases, the microimage elements of at least two of the arrays may only differ in colour. However, in preferred examples, the microimage elements of the first, second and third arrays further differ from one another by one or more of shape, size and orientation.

The microimage elements of at least the first array may typically comprise icons such as symbols, geometric figures, alphanumeric characters and the like and most preferably provide information. The microimage elements of one or more of the other arrays may also be formed as icons or more generic patterns as mentioned above.

In preferred examples, the microimage elements are printed on the substrate using any suitable printing process such as gravure, wet or dry lithographic printing, screen printing, intaglio printing and flexo printing. However, one or more of the arrays of microimage elements could also be formed as grating structures, recesses or other relief patterns on the substrate. Anti-reflection structures may also be used as described in WO-A-2005/106601.

Micro-focusing elements, such as microlenses and concave mirrors, are preferably formed by embossing into the substrate surface, cast-curing or the like.

Moiré magnifiers generated by the current invention can be either 2-dimensional (2D) or 1-dimensional (1D) structures. 2D moiré magnification structures using spherical lenses are described in more detail in EP-A-1695121 and WO-A-94/27254. In a 2D moiré magnifier the microimages are magnified in all directions. In a 1D moiré magnification structure the spherical microlenses or micromirrors are replaced with a repeating arrangement of cylindrical microlenses or micromirrors. The result of this is that the micro-image elements are subject to moiré magnification in one axis only which is the axis along which the mirrors exhibit their periodic variations in curvature or relief. Consequently the micro-images are strongly compressed or de-magnified along the magnification axis whilst the size or dimension of the micro image elements along the axis orthogonal to the magnification axis is substantially the same as they appear to the observer—i.e. no magnification or enlargement takes place.

The moiré magnifier generated by the current invention can form a security device by itself but could also be used in conjunction with other security features such as holograms, diffraction gratings and other optically variable effect generating structures.

The optical device of the current invention can be used to authenticate a variety of substrates—with the nature of the substrate, in particular its thickness and flexibility having an influence on the corresponding properties of the optical device.

The invention has particular value in protecting flexible substrates such as paper and in particular banknote, where the device could define a patch, strip or thread. The thickness of the device will be influenced by how its employed within the banknote though to both avoid deformation of paper ream shape during the banknote printing process and further more the form and flexibility of the banknote itself, it is desirable that the thickness of the device does not exceed half of the thickness of the banknote itself (typically 85-120 um)—therefore it anticipated that in any embodiment the optical device will be less than 50 um including securing adhesives and preferably substantially so.

For example as a patch applied to a banknote the desired thickness will range from a few microns (excluding securing adhesive) to a maximum of 35-40 um (again excluding adhesive) for a label. Whilst for the case of a strip, the thickness will range again from a few micrometers for the case of a hot-stamped or transferred strip, up to 35-40 um for the case of a non transferred strip wherein the supporting carrier layer is retained (again excluding securing adhesives) as would be necessary should the strip be applied over a mechanical aperture in the banknote substrate.

In the case of a windowed thread preferred final thickness is in the range of 20-50 um.

Thicker versions of the security device (up to 300 $\mu$m) could be employed in applications which include passport paper pages, plastic passport covers, visas, identity cards, brand identification labels, anti-tamper labels—any visually authenticable items.

Furthermore, the device could be provided in a transparent window of a security document to enable it to be viewed in transmission.

Some examples of security devices according to the invention will now be described with reference to the accompanying drawings, in which:—

FIG. 2d illustrates the appearance of the versions of FIGS. 2a-2c but with all icons in the same colour;

FIG. 3 illustrates schematically the location of the magnified images shown in FIG. 2;

FIG. 5 illustrates the appearance in plan view of a second example of the security device according to the invention;

FIGS. 6A and 6B illustrate a unit cell and pad of the background of the example shown in FIG. 5 respectively;

FIGS. 9A-9C illustrate the example of FIG. 7 when viewed at different angles;

FIG. 10 illustrates in cross-section a schematic view of a transmissive based security device used for the FIG. 2 example;

FIGS. 12a and 12b illustrate schematically two examples of apparatus for printing part of a security device shown in FIGS. 1-11;

Figure 1:
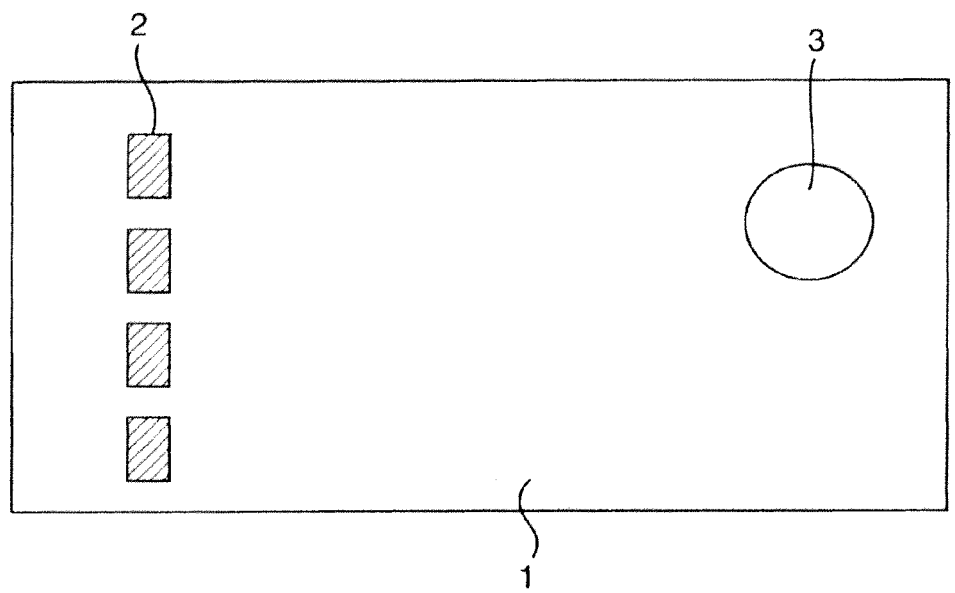
FIG. 1 is a schematic plan view of a banknote.

FIG. 1 illustrates schematically a banknote 1 having a security thread 2 exposed at windows and a further transparent window 3. The banknote 1 may be made of paper or polymer (such as bi-axially oriented polypropylene) and one or both of the security thread 2 and window 3 incorporates a security device according to the invention.

Figure 2A:
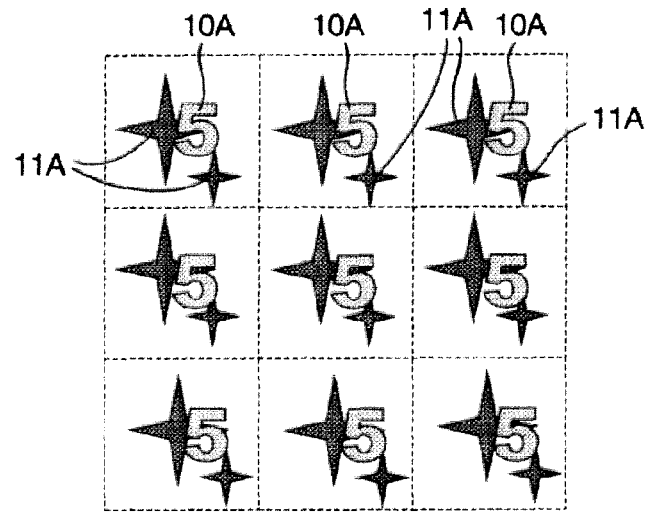
FIGS. 2a-2c illustrate the appearance of three versions of a first example of a security device in plan view.

FIGS. 2-4 illustrate a first example of the security device according to the invention. As can be seen in FIG. 2a, the appearance of the security device when viewed normally, i.e. perpendicularly, is a first array 10 of magnified image elements, in this case red coloured icons 10A in the form of a figure '5' against a background 11 formed by a magnified set of blue stars in pairs of large and small stars. The relative depths of the icons 10A and background 11 can be seen more clearly in FIG. 3 where the '5' icons 11 appear below the upper surface of the substrate 7 with the background plane 11 below the '5' icons 10A.

FIG. 4 illustrates the components of the security device in more detail. This shows that the background 11 is formed by an array of unit cells 11A (FIG. 4A) arranged side by side in an array as shown in FIG. 4B. The '5' icons 10A are formed as an array of unit cells as shown in FIGS. 4C and 4D. As shown in FIG. 4, the pitch of the unit cells 11A of the background array 11 in the X and Y directions is A2x, A2y. The pitch of the '5' icons 10A is A1x, A1y. Typically, A2x equals A2y and A1x equals A1y. However, there is a small difference between the pitches of the '5' icons 10A on the one hand and the unit cells of the background 10 on the other.

FIG. 10 illustrates in cross-section the overall structure of the device shown in FIGS. 2-4. Thus, the device comprises a transparent, PET or other polymer layer 20 (corresponding to substrate 7) on the upper surface of which is formed a two-dimensional array of spherical microlenses 22. The diameters of the microlenses 22 is typically in the range 1-100 microns, preferably 1-50 microns and even more preferably 10-30 microns, thus defining pitches in a similar range.

The focal length of the microlenses 22 (as measured from their planar back surface) is substantially equal to the thickness t of the optical spacer layer which in this example comprises the thickness of the substrate 20 plus the thickness of a print receptive layer 21 on the opposite surface of the substrate 20 to the microlens array 22 so as to define a focal plane 24 substantially coincident with the surface of the print receptive layer. On the print receptive layer 21 is first printed the microimage array of '5' icons 10A in a red colour. Next, the background array 11 is printed in a blue colour. It will be seen in FIG. 10 that the two arrays are each printed on the print receptive layer 21 coincident with the focal plane 24 although the background print 11 also overlaps the '5' icon array 10 as shown at 25.

The present invention is not limited to any specific type or geometry of microlens, the only requirement being that the microlens can be used to form an image. Microlenses suitable for the present invention include those that refract light at a suitably curved surface of a homogenous material such as plano-convex lenslets, double convex lenslets, and fresnel lenses. Preferably the present invention will comprise spherical microlenses but lenses of any symmetry including cylindrical lenses could be employed. Both spherical and aspherical surfaces are applicable to the present invention. It is not essential for the microlenses to have a curved surface. Gradient refractive index (GRIN) lenses image light by a gradual refraction throughout the bulk of the material as a result of small variations in refractive index. Microlenses, based on diffraction, such as Fresnel zone plates can also be used. GRIN lenses and amplitude or mask based fresnel zone plates enable the surface containing the microlens array to be planar and offers advantage in print receptivity and durability.

It is preferable to use a periodic array of lenses generated by a replication process. Master microlens arrays can be produced by number of techniques such as photothermal techniques, melt and reflow of photoresist and photoresist sculpture. Such techniques are known to those skilled in the art and are detailed in chapter 5 of "Micro-Optics: Elements, Systems, and Applications" edited by Hans Peter Herzig, published by Taylor and Francis, reprinted 1998. The master microlens structure can then be physically copied by commercially available replication techniques such as hot embossing, moulding or casting. Materials into which the microlens structures can be replicated include but are not limited to thermoplastic polymers such as polycarbonate and polymethylmethacrylate (PMMA) for the hot embossing and moulding processes and acrylated epoxy materials curable by heat or radiation for the casting process. In a preferred process the microlens array is replicated via casting into a UV curable coating applied to a carrier polymer film such as PET.

For simplicity the following examples and embodiments will describe the use of spherical microlenses.

In order to create the phenomena of moiré magnification and enable the generation of moving images a pitch mismatch is introduced between the microimage array and the microlens array. One method is to have a microlens and microimage array with substantially the same pitch where the pitch mismatch is achieved by introducing a small rotational misalignment between the microimage and microlens array. The degree of rotational misalignment between the microimage and microlens array is preferably in the range 15°-0.05°, which results in a magnification range of between −4×-1000× for the microimage array. More preferably the rotational misalignment is in the range −0.1°, which results in a magnification range of between −25×-500× for the microimage array.

Alternatively the microimage array and microlens array are in substantially perfect rotational alignment but with a small pitch mismatch. A small pitch mismatch would equate to a percentage increase/decrease of the pitch of the microimage array relative to the microlens array in the range 25%-0.1%, which results in a magnification range of between −4×-1000× for the microimage array. More preferably the percentage increase/decrease of the pitch of the microimage array relative to the microlens array is in the range 4%-0.2%, which results in a magnification range of between −25×-500× for the microimage array.

It is also possible to use a combination of a small pitch mismatch and a small rotational misalignment to create the phenomena of moiré magnification and enable the generation of moving images.

The result of the pitch mismatch between the arrays 10, 11 and the spherical lens array 22 causes moiré magnification of the microimages at different depths (as seen in FIG. 3).

The degree of magnification achieved is defined by the expressions derived in "The Moiré magnifier", M. Nutley, R Hunt, R Stevens & P Savander, Pure Appl. Opt. 3 (1994) pp. 133-142.

To summarise the pertinent parts of this expression, suppose the micro image pitch=A and the micro lens pitch=B, then magnification M is given by:

$$M=A/SQRT[(B\cos(Theta)-A)^2-(B\sin(Theta))^2]$$

where, Theta equals angle of rotation between the 2 arrays.

For the case where A≠B and where Theta is very small such that cos(Theta)=1 & sin(Theta)=0

$$M=A/(B-A)=S/(1-S)$$

Where S=B/A

However for large M>>10 then S≈must unity and thus $$M≈1/(1-S)$$

The depth of the synthetic image relative to the surface plane derives from the familiar lens equation relating magnification of an image located a distance v from the plane of lens of focal length f. This being $$M=v/f-1$$

Or, since typically v/f>>1

$$M≈v/f$$

Thus the depth v of the synthetically magnified image=M*f

Figure 2B:
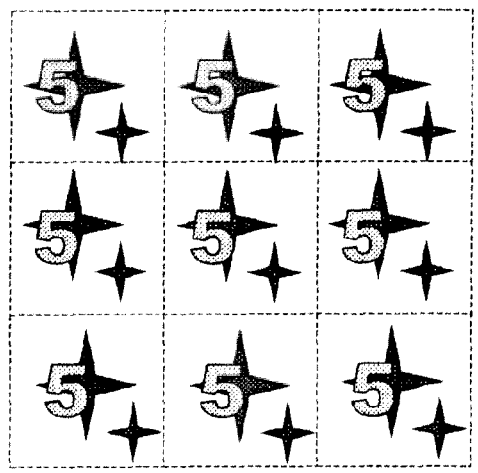
Figure 2C:
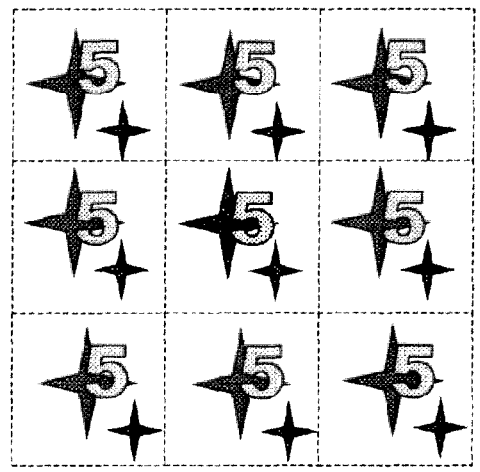
Figure 4C:
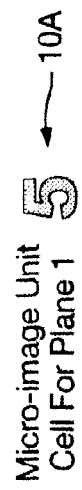
FIGS. 4C and 4D illustrate the foreground image of the image shown in FIGS. 2 and 3 as a unit cell and partial array respectively.
Figure 4D:
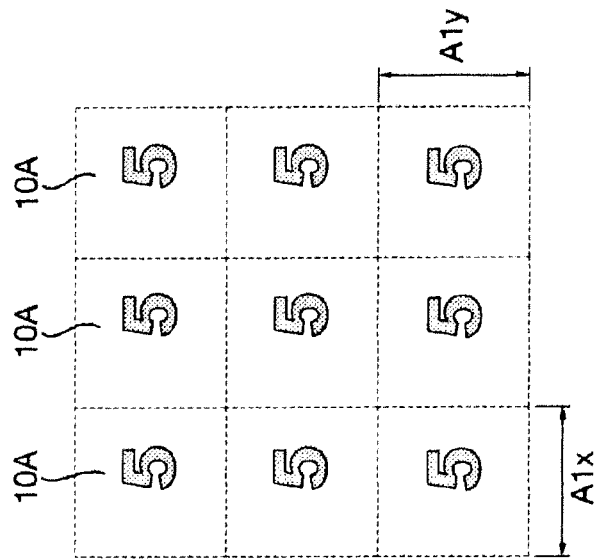
Figure 4A:
FIGS. 4A and 4B illustrate the background of the device shown in FIGS. 2 and 3 as a unit cell and partial array respectively.
Figure 4B:
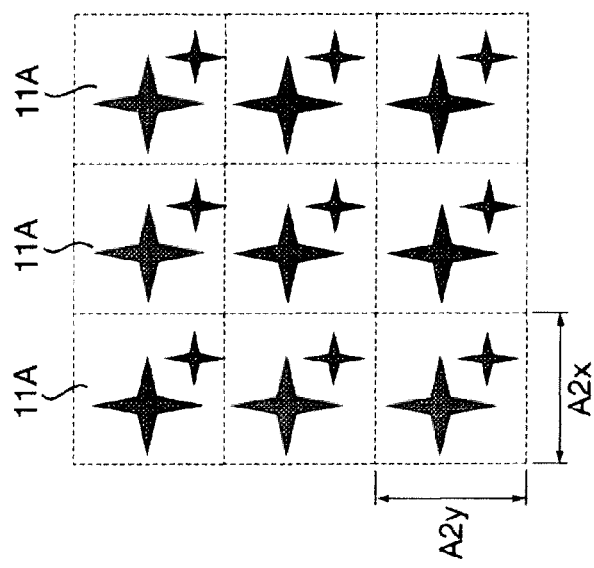
Figure 8A:
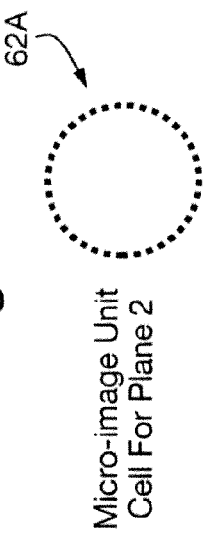
FIGS. 8A and 8B illustrate a unit cell and part of the array of the first background of the third example.
Figure 8C:
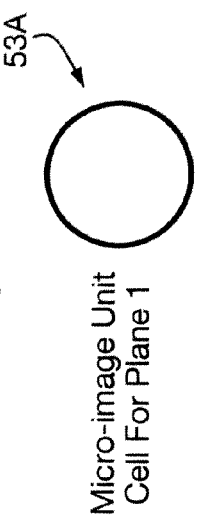
FIGS. 8C and 8D illustrate a unit cell and part of the array of the second background of the third example.
Figure 8B:
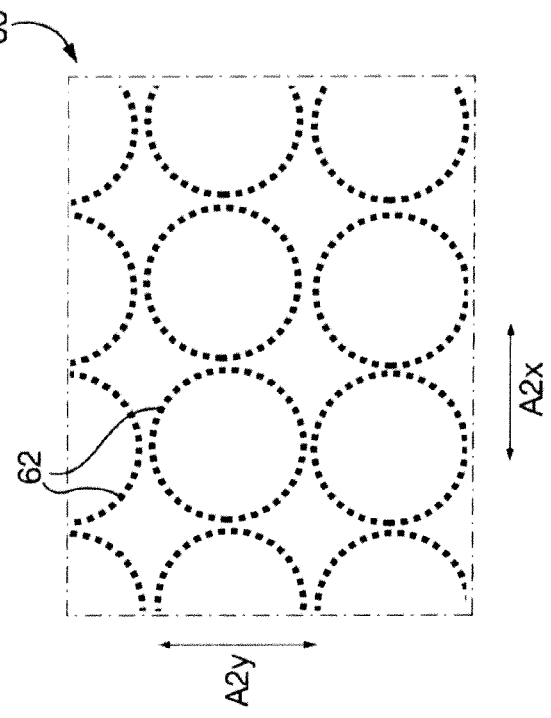
Figure 8D:
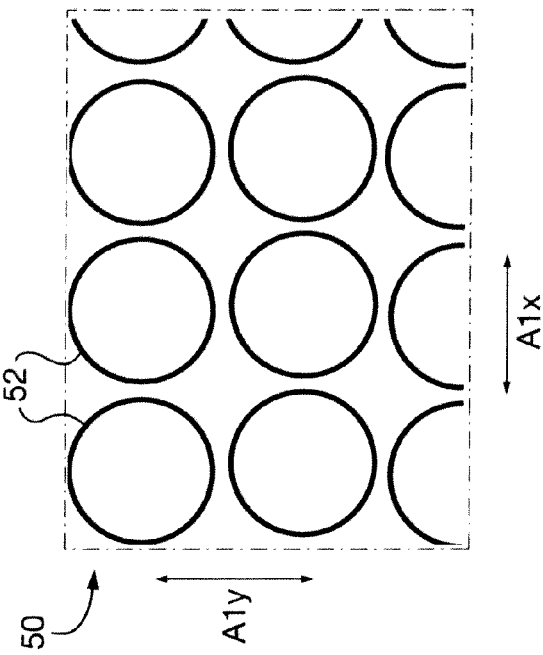

FIGS. 2a-2c show the second array 11 in different registration positions relative to the first array 10. The key point is that the design and choice of the first and second array elements or icons 10A, 11A is such that there is no significant change in information, content, symbolic relevance or aesthetic appearance when the position of one array is varied relative to the other—in other words the two arrays are not registration sensitive or have a strongly preferred register requirement. It should be noted that since the second array 11 is obscured or blocked by the first array 10 it is preferable that icon types which are especially information bearing, for example a denominational or alphanumeric symbol or such like are located in the first array 10 which is visualised as being in front of the second array 11. Furthermore, in the example shown in FIG. 2, each unit cell 11A of the second array 11 is comprised of two identical icons i.e. a large and small star—as a consequence, in informational terms there is a redundancy of information in each unit cell. This redundancy property means that if at some relative registration between the two arrays the icon pattern from the first array (the 5's) substantially obscures the array of larger stars, then the smaller star icon array can be readily visualised without significant obscurement or interference from the first array. Consequently the observer unambiguously sees two synthetically magnified icon arrays comprising a first pattern of red 5's at a given depth behind or in front of the surface plane of the deviation and located behind that pattern at a different image depth a second pattern of blue stars (50% large and 50% small). From the perspective of public recognition the visual effect or appearance will not differ significantly with the position of the first pattern relative to the second pattern.

In summary for the image design shown in FIG. 2, the describable optically variable effect is insensitive (i.e. substantially invariant) to uncontrolled manufacturing variations in the register of the first icon array 10 to the second array 11. This is an important aspect of this invention.

It should be recognised that the use of contrasting colours for the first and second image arrays 10, 11 assists the viewer to discriminate between the two arrays particularly in the regions where the individual elements overlap and thus assisting in the public recognition and verification of such a device. To help understand the benefits of colour differentiation we show in FIG. 2d, the same two image arrays as before but this time both the first and second arrays are provided/printed in a single colour (with three different relative positions for the arrays being shown as in FIG. 2a). As can be seen where the image elements from the first and second pattern overlap it is difficult to distinguish the outline of the upper first array element from the underlying second array element, which can serve to confuse the observer or viewer thus reducing the effectiveness of having multiple image planes.

EXAMPLES

Suppose the structure of FIGS. 2 & 10 was comprised of micro lenses 22 with a focal length f of 40 µm or 0.04 mm. Furthermore let us suppose both the micro lenses and the supporting substrate 20 were both comprised of materials with refractive index n of 1.5. Then it follows that the base diameter D of the lenses will constrained by the expression $$D≤f*2(n-1) \text{ and therefore } D≤0.04*2(1.5-1) \text{ giving}$$
$$D≤0.04 \text{ mm.}$$

We might then choose a value for D of 0.035 mm and a lens pitch B of 0.04 mm (along each axis), resulting in a lens array with a f/# number close to unity with reasonable close packing (inter lens gap 5 um).

In a first example suppose we required the first image array 10 to be located 2 mm behind surface plane of the substrate and the second image array 11 to be located 6 mm behind the surface plane (note images behind the surface plane are by definition virtual and a more detailed analysis shows them to be non-inverted relative to micro image object array).

For further illustrative simplicity we assume that A1y=A1x and A2y=A2x.

Given M=v/f, then it follows if f=0.04 mm and v=2 mm, then M1=2/0.04=50.

Therefore since M1=A/(B-A0=50, it follows 50 (B-A1) =A1, giving A1=B (50/51)

Substituting B=0.04 mm we obtain A1=0.0392 mm.

Similarly M2=6/0.04=150 and thus 150 (B-A2)=A2, giving A2=B (150/151)=0.0397 mm.

In a second example suppose we required the first image array 11 to be located 2 mm in front of the surface plane, whilst the second image array 11 remains located 6 mm behind the surface plane.

In contrast to the previous example here the first image array 10 will form a real inverted image and thus the sign of the magnification will be negative (which follows from assigning a negative value for the image distance v in the previous expression for magnification).

Hence M1=-2/0.04=-50 and thus -50(B-A1)=A1, giving A1=50/49B=0.0408 mm.

Hence we see that for the first image array to be located in front of the surface plane (i.e appearing to float) its micro image array must have a pitch larger than the lens pitch. Conversely if the image pitch is less than the lens pitch then the image array will appear to be located below the surface plane.

Figure 10A:
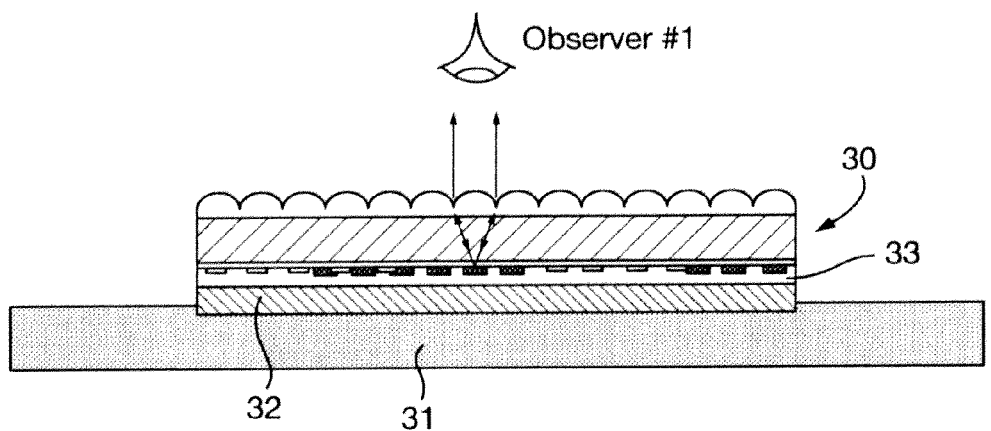
FIGS. 10a and 10b illustrate the device of FIG. 10 when applied to a substrate surface and a window respectively.
Figure 10B:
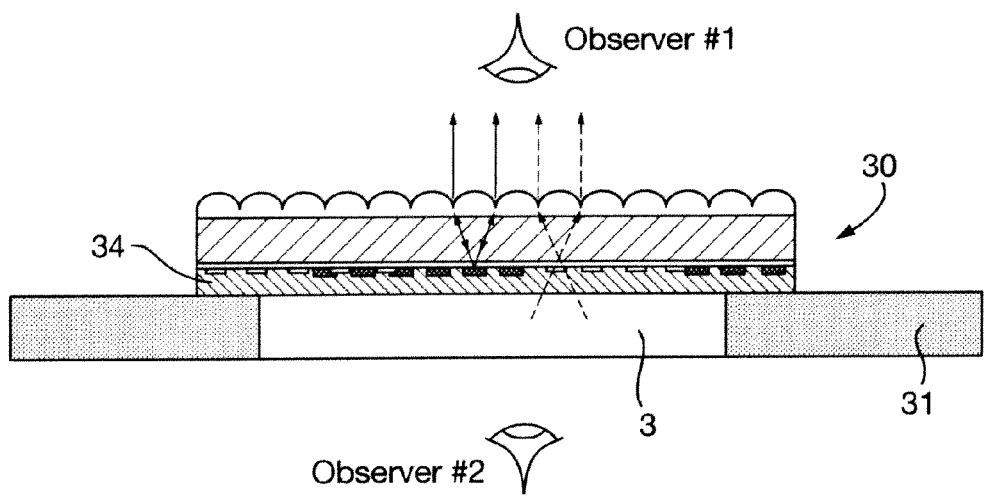

FIGS. 10a and 10b show two schematic figures, illustrating how the lens based moiré system would operate in reflection only mode and in both reflection and transmission respectively. FIG. 10a shows the reflection only scenario where the device 30 having a similar structure to that of FIG. 10 is either applied onto a substantially opaque substrate 31 or partially embedded into an opaque substrate (e.g. a windowed thread) via an adhesive layer 32. In this case the synthetically magnified image viewed by the observer is ultimately derived from light that has been back scattered or reflected from the micro image arrays 10, 11 and the medium that acts as a background to the micro-image array. The greater the reflective contrast between the micro image arrays and the surrounding back ground medium the greater the visual contrast of the synthetically magnified images. Now it may be that the colour or reflective properties of the substrate 31 are non optimal—for example the substrate may be of low reflectivity or a similar colour to one of the micro image arrays. To address this we show in FIG. 10a the addition of an optional mask coat layer 33 located between the micro print interface and the adhesive layer 32 bonding to the device to the substrate 31. The mask layer 33 will typically contain a reflective opacifying pigment such as, but not limited to, titanium dioxide particles in a resin binder. The colour of this layer could be simply white or a colorant could be added to ensure that this mask layer or background reflecting layer exhibits a desired hue which contrasts with one or both micro image arrays.

In a further example the mask coat and one of the micro image arrays have overtly the same colour, however one or other entity has been provided with a metameric property. Consequently under normal viewing the relevant micro image array is only weakly discerned (if at all) against the background colour of the opaque mask—however when viewed under a metameric filter said micro image array or more pertinently its synthetically magnified image becomes strongly evident. Alternatively the mask coat may be provided with a fluorescent additive such that when viewed under a fluorescent light the mask coat provides a fluorescent background against which the absorbing micro image arrays form black synthetically magnified images.

The mask coat may also function as a durability enhancing layer.

Examples of metameric inks are provided in GB1407065. Referring again to FIG. 2 the first microimage array 10 of "5"'s could be printed in a first metameric ink and the background array 11 of stars in a second metameric ink where the metameric properties of the inks are such that they appear to be of an identical colour when viewed in daylight, but when viewed in filtered light, the two inks will appear to have different reflective colours.

FIG. 10b shows the scenario where the device 30 is applied at least partially over a transparent aperture 3 within the substrate 31. It is well known to incorporate security devices into transparent apertures within secure documents (see below). In this case the synthetically magnified image may be viewed in reflection and/or transmission through the viewing aperture 3 in the substrate 31. The observer will only see magnified image when located in position #1. As can be seen in FIG. 10b, the opaque mask coat is omitted so we can observe the moiré magnification system in transmission. It is also a requirement that the adhesive layer 34 has good optical clarity (i.e. low scatter low absorption)

It should be noted that if the printed micro-images 10A, 11A are formed from an ink or colorant that is substantially opaque, then the synthetically magnified image will be coloured when viewed in reflection, but will form a high contrast essentially black image when viewed in transmission.

A requirement for a coloured image to be viewed in transmission is that the micro images must have some degree of translucency. Light must be able to pass through the printed images and the desired colour transmitted. It should be recognised that in regions were the two arrays 10, 11 and therefore magnified images overlap we will have additive colour mixing. For example if the two array colours are red and blue then in areas of overlap the image will be magenta.

Note also that if the observer views the device from location #2, then no synthetically/moiré magnified image is observed, but instead an unmodified or direct image of the micro image patterns.

Figure 11:
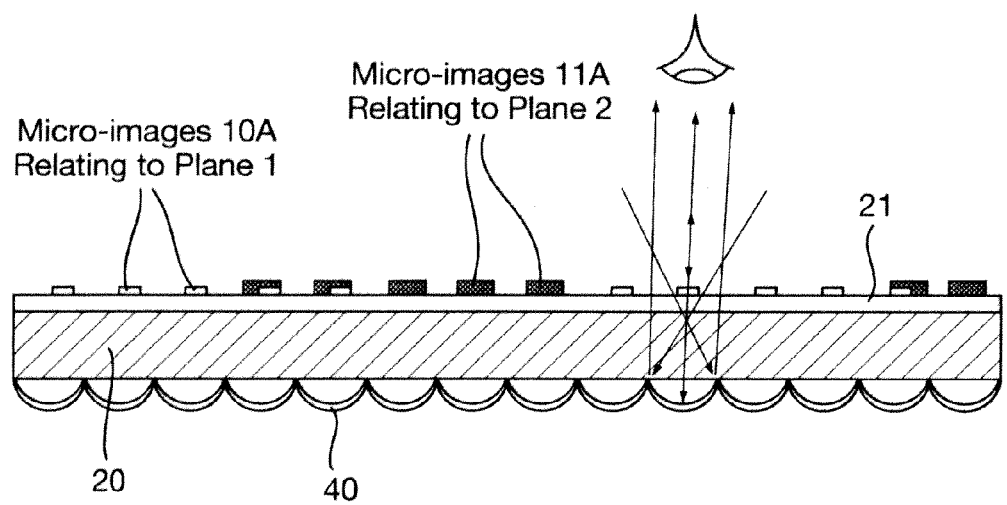
FIG. 11 illustrates in cross-section a schematic view of a reflective based security device.

As an alternative, the security device could be fabricated as a mirror-based moiré device as shown in FIG. 11. In this case, the spherical microlens array 22 is replaced by a spherical or aspheric concave mirror array 40 formed on one surface of the transparent polymer substrate 20. The other surface is provided with printed microimage arrays 10, 11 as before.

It should be noted that the focal length of a concave mirror is equal to half its radius of curvature R and therefore can have a limiting minimum value approaching one quarter of the mirror base diameter. In simple terms, for a given base diameter the focal length and F number of a mirror can be one quarter of the value of equivalent lens (assuming typical refractive index of 1.5). However as reducing F number equates to reducing depth of focus, then in practice it will often be desirable to have a mirror base diameter much less than 2R.

For example considering the preferred device thicknesses cited earlier we may require the mirror focal length to be 40 um—then this requires the mirror radius R to have a value 80 um and thus a maximum theoretical base diameter approaching 160 um and thus an F number f/#=0.25 mm.

This structure is intended for viewing only in reflection mode and thus is most relevant for application onto opaque substrates (strip & patch) or partially embedding into opaque substrates (windowed thread). As per the lens system the printed micro images must be coincident with the focal plane of the mirrors to a precision determined by the depth of focus or field of the mirror system.

Critically the plane 1 micro image array 10 must be applied to the print receptive layer 21 or substrate first, then followed by the application of the plane 2 micro image array 11. This ensures that the reflective image pertaining to first plane of micro images 1 is visualised as being in front of the second plane of micro images—the first plane of images generate a synthetically magnified image.

Also since the incident light has to pass through or be transmitted by the printed micro image arrays 10, 11 (i.e. spatially modulated) before being reflected back as collimated light by the mirror array, then it follows that if the print micro images are substantially opaque the synthetically magnified images will take on a blackish colour or hue against the metallic hue provided by the mirror background. For the synthetically magnified images to appear with the colour of their corresponding micro image array then it is necessary that the micro images are at least partially translucent. The more translucent the micro images the brighter the colour of the synthetic images—however at a cost of reduced image contrast relative to the background.

If the metal coating on the mirrors is 'white' reflector such as Aluminium then the background hue or colour surrounding the synthetic images will be silver—white or achromat in appearance. However it should be recognised that other affordable coloured metals such as Copper or it alloys may be be used. Other metals such as Silver, Gold, Platinum, Chrome, Nickel, Nickel-Chrome, Palladium, Tin etc may also be used.

In all the examples, as the device is tilted, the '5' icons 10A will appear to move relative to the background 11.

In each case, the microlens array 22 or concave mirror array 40 can be integrally moulded into the polymer substrate 20 or could be formed on the surface of the substrate 20, for example by cast-curing or the like.

A second example is illustrated in FIGS. 5 and 6. This is similar to the previous example except that the background image array 50 is defined by a series of overlapping blue circles 5 defined by means of a unit cell 52A. The foreground array 10 is as before.

Figure 7:
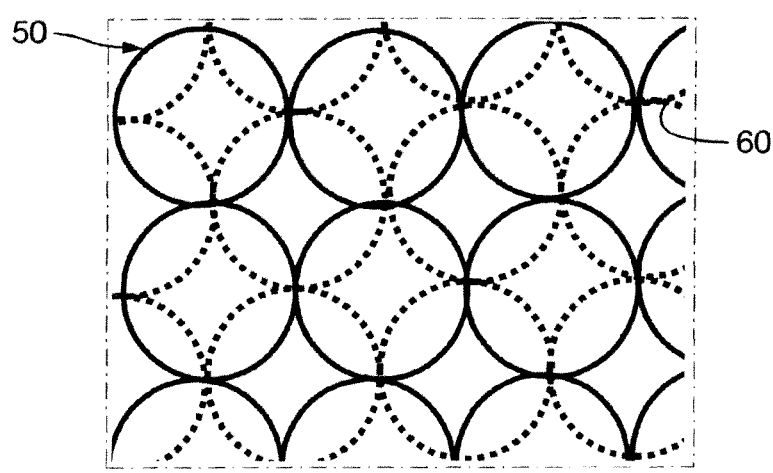
FIG. 7 illustrates the appearance of a third example of the security device according to the invention in plan view but with one set of images omitted.

In the third example shown in FIGS. 7-9, a further background layer is provided. Thus, a microlens array or concave mirror array is provided on one surface of the substrate 20 (as in FIGS. 10 and 11) and then a second, image element array 50 of blue circles 52 is printed on the opposite surface of the substrate. A third array 60 of green circles 62 is then printed onto the array 50 of blue circles 52. The unit cells 53A, 62A and parts of the arrays of these second and third layers are shown in more detail in FIG. 8.

The pitches of the blue circles 52 and green circles 62 are selected so that the moiré magnified images appear to be at different depths (the green circles 62 below the blue circles 52) and in turn are at a different depth to the '5' icons 10A (not shown in the drawings). The effect of this depth difference can be seen in FIG. 9 which illustrates the appearance of the security device when viewed to the left, in alignment, and to the right respectively of a normal to the security device. As can be seen in FIGS. 9A-9C, the blue and green circles appear to move relative to one another. In addition, the '5' icons 10A are at a different pitch from circles 52, 62 and will appear at a different depth to the circles and move relative to the circles.

In one case, the relative pitches are chosen so that the '5' icons 10A appear, in the depth direction, between the circles 52 and 62 while in other examples the '5' icons 10A appear above both circles 52 and 62.

Figure 20:
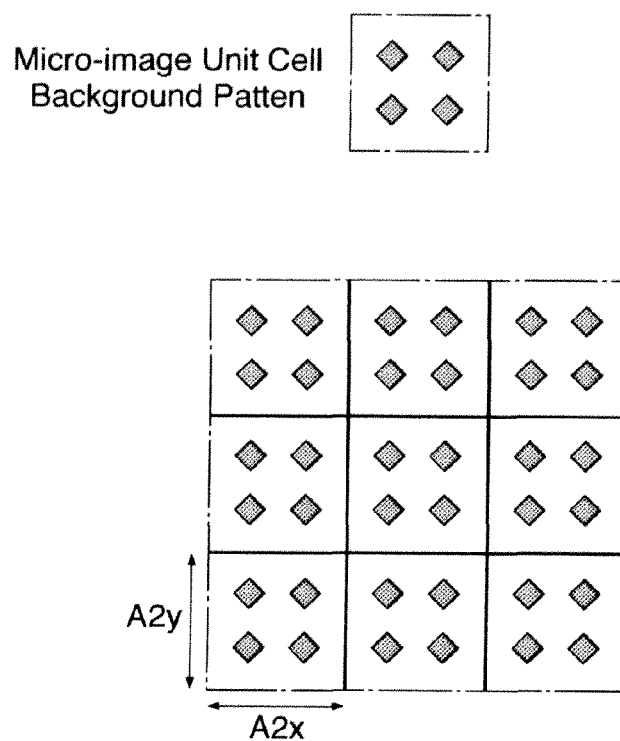

FIGS. 18, 19 and 20 show further examples for the background image array. In FIG. 18 the array is a generic line pattern, and in FIGS. 19 and 20 it is an array of geometric shapes. Such generic patterns offer the advantage of multiredundancy if parts of the background pattern are concealed by the first image array and also there is no requirement of registration between the first image area and the background image arrays.

Figure 12A:
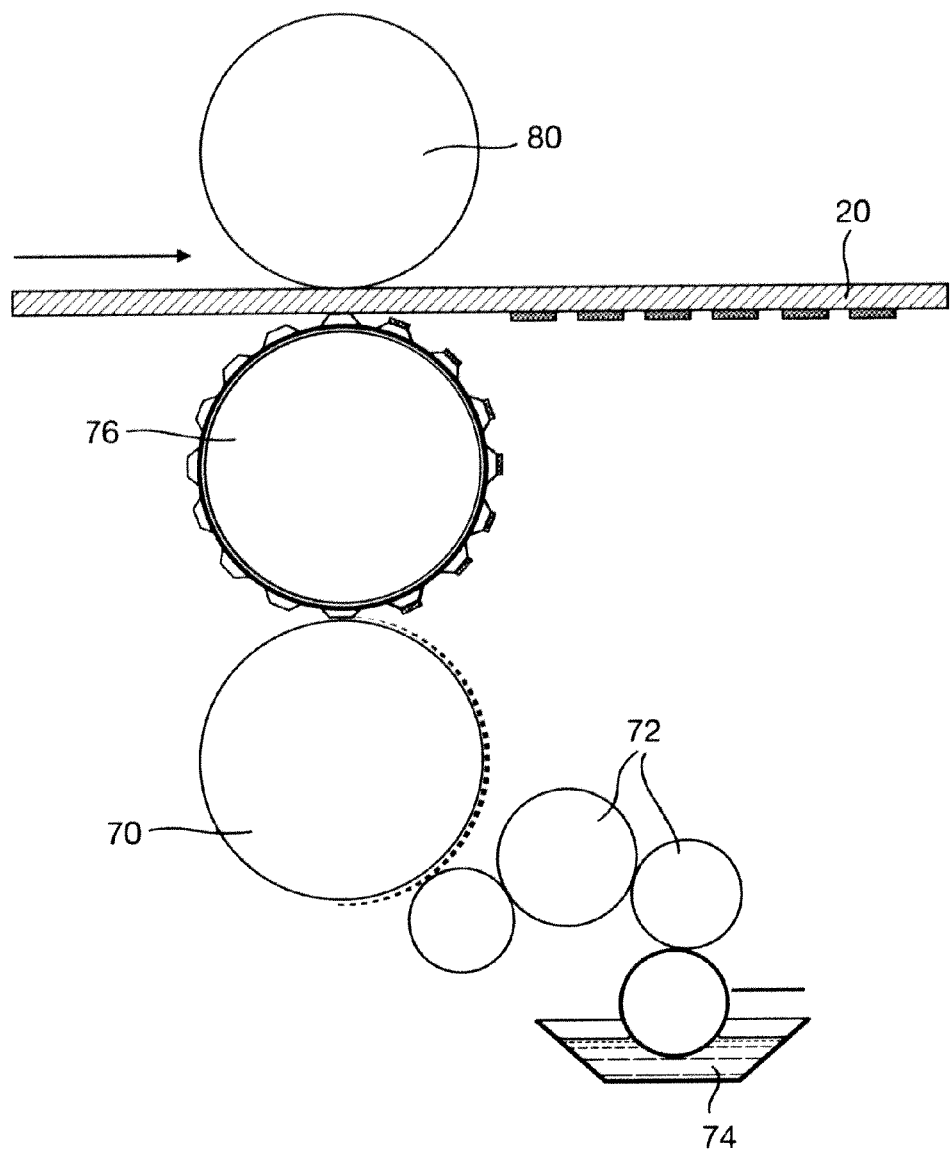

FIG. 12a illustrates part of apparatus for printing the image elements on the substrate. The apparatus shown in FIG. 12 comprises an inking roll 70 coupled via a roll chain 72 to an ink reservoir 74. Ink is transferred by the roll 70 onto a print roll 76 carrying proud printing elements 78 corresponding to the microimage elements of the array concerned. The substrate 20 is fed between the print roll 56 and an impression roller 80 and the image elements are printed onto the substrate 20.

A second apparatus similar to that shown in FIG. 12a is provided downstream of that apparatus to print the next array of image elements.

FIG. 12b illustrates alternative apparatus for printing the image elements. Ink is transferred by the roll 70 onto a print roll 82 carrying recessed printing elements corresponding to the microimage elements of the array concerned. A doctoring blade 84 contacts and removes ink or colorant off the non-recessed areas of the print roller 82. The substrate 20 is fed between the printing roller 82 and an impression roller 80 and the image elements are printed onto the substrate. A second apparatus similar to that shown in FIG. 12b is provided downstream of that apparatus to print the next array of image elements.

In the current invention there is no registration requirement between the two microimage arrays and therefore it is not necessary to print the two arrays in-line and the second array can be printed using a second off-line process.

Microlenses or concave micromirrors are provided on the opposite surface of the substrate 20 by cast-curing, moulding or the like.

In the examples described above, the microimage elements have been provided by printing onto the substrate. It would also be possible to provide some or all of the image elements as relief structures and examples of some of these are shown in FIGS. 13A-13J. In these Figures, 'IM' indicates the parts of the relief generating an image while 'NI' indicates those parts which do not generate an image.

Figure 13:
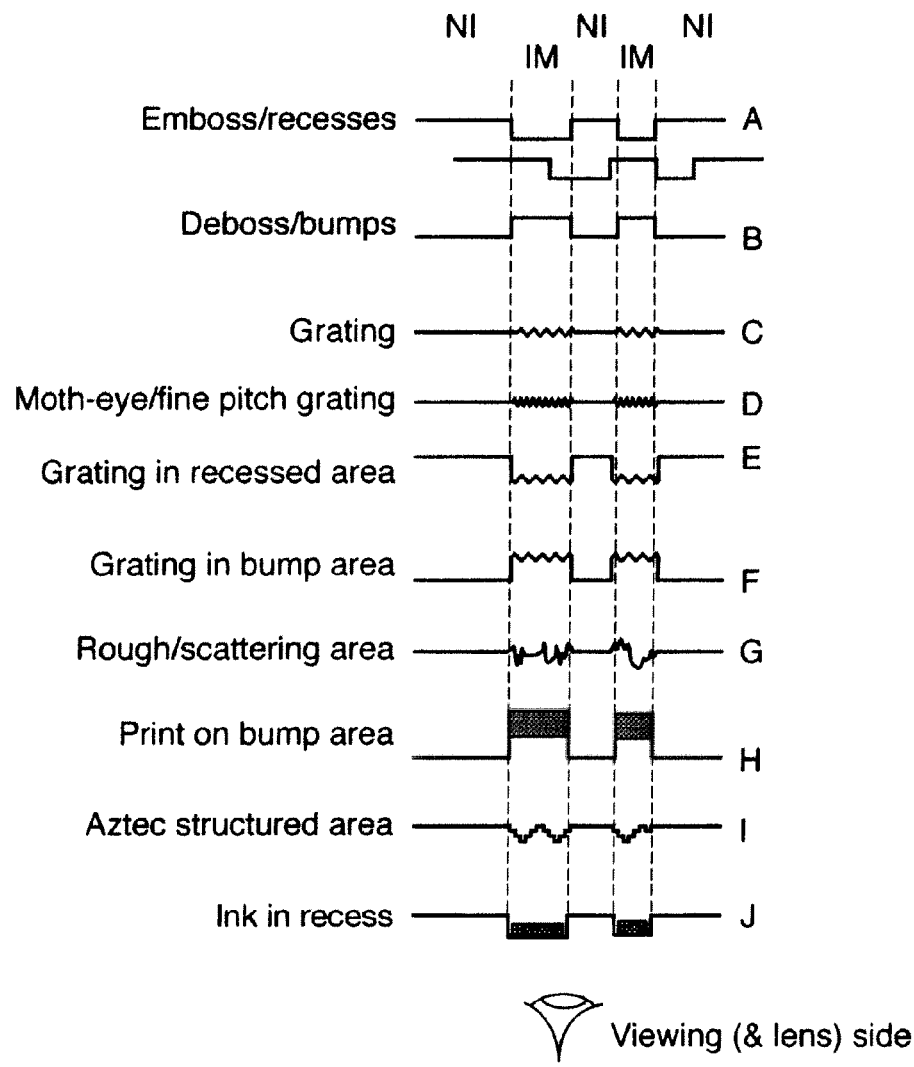
FIGS. 13A-13J illustrate different types of relief microimages.

FIG. 13A illustrates embossed or recessed image elements. FIG. 13B illustrates debossed image elements. FIG. 13C illustrates image elements in the form of grating structures while FIG. 13D illustrates moth-eye or other fine pitch grating structures.

These structures can be combined. For example, FIG. 13E illustrates image elements formed by gratings in recesses areas while FIG. 13F illustrates gratings on debossed areas.

FIG. 13G illustrates the use of a rough embossing.

FIG. 13H illustrates the provision of print on an embossed area while FIG. 13I illustrates "Aztec" shaped structures.

FIG. 13J illustrates ink filled recesses.

The various embodiments of the device construction described above can be slit or out into patches, foils, stripes, strips or threads for incorporation into plastic or paper substrates in accordance with known methods.

In one embodiment the current invention could be incorporated into a security paper as a windowed thread.

Figure 14:
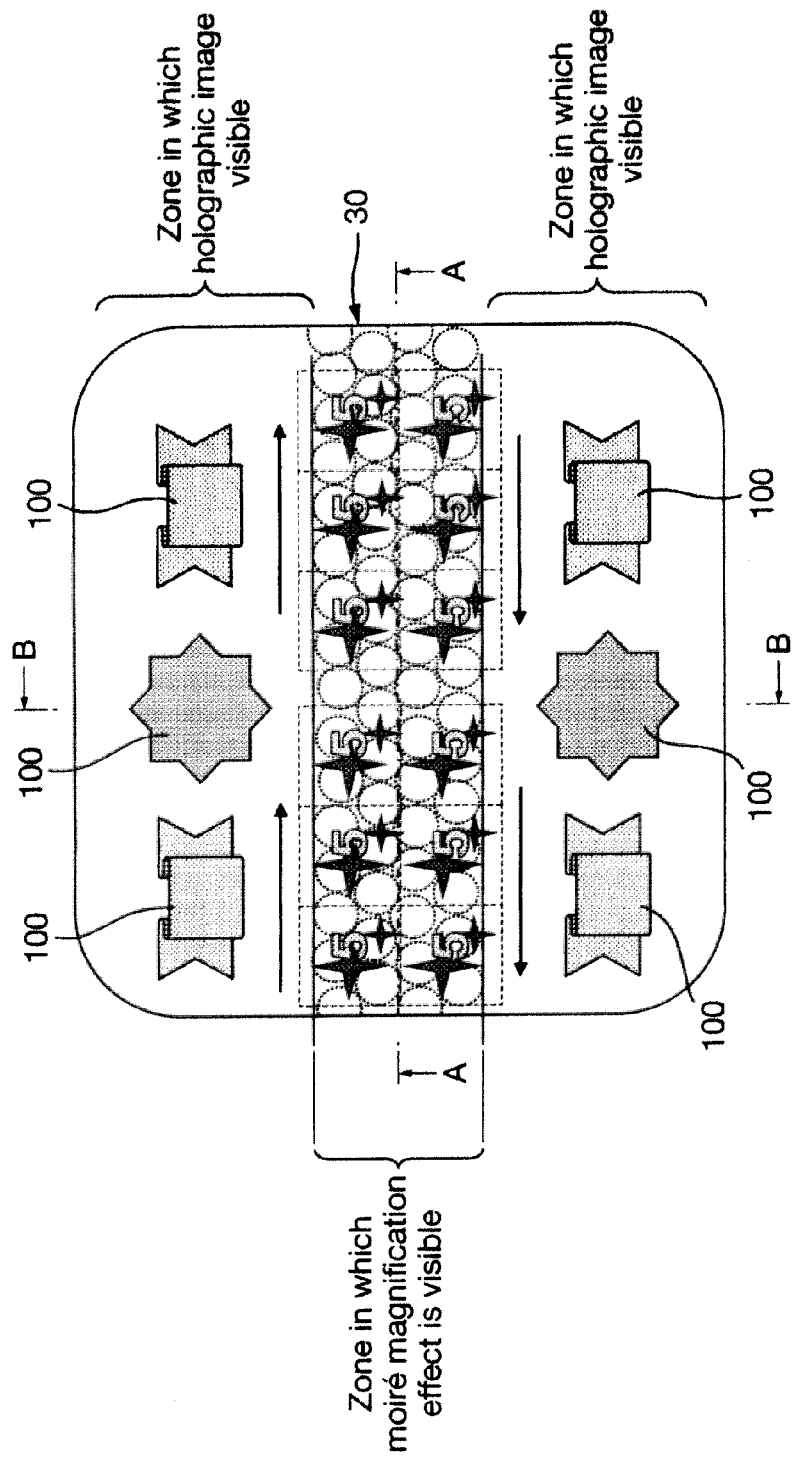
FIGS. 14 to 16 are views of other examples of moiré magnification security devices combined with holographic security devices.

In further examples, the security device also includes one or more other optical security features. An example of this is shown in FIG. 14. In this example, a moiré magnifier device 30 is formed as described with reference to FIGS. 2 and 10. The security device also includes a number of holographic image generating structures 100. The holographic image structures 100 can be cast or embossed into the same resin as the microlenses but equally two different resins, one suitable for casting the microlenses and one suitable for embossing a holographic structure could be applied in register. Alternatively the holographic structures could be embossed into a polymeric lacquer positioned on the opposite side of the polymeric layer to the microlenses.

Figure 15:
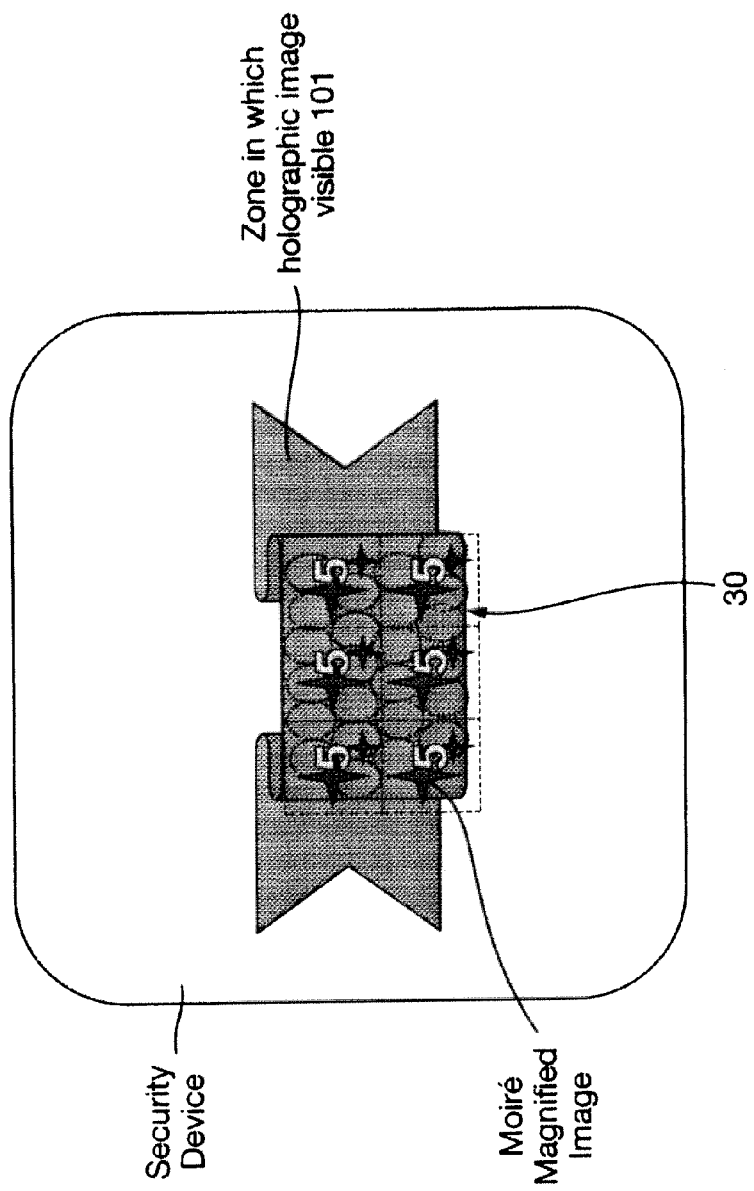

The holographic generating structures 100 can be in the form of holograms or DOVID image elements. In the label construction shown in FIG. 14, the microlenses and the visualisation of the two magnified image arrays is located in a central horizontal band or region of the label whilst the holographic generating structures 100 are located on either side. However, it should be understood that this example is purely illustrative and for example the holographic generating structures 100 could be located in a central band or strip with the moiré magnifier 30 being provided in one or more regions on either side. Alternatively moiré magnified images and the image provided by the holographic generating structures could be integrated into a single image by each providing components of a single image. FIG. 15 illustrates an example of such an integrated design where the holographic generating structures 101 form a scroll and in the middle of the scroll the holographic structures are replaced with a moiré magnifier 30 to create a moiré magnified image in this case of moving "5"'s and stars.

In the case of the holographic structures 100, 101 these can have any conventional form and can be fully or partially metallised. Alternatively the reflection enhancing metallised layer can be replaced with a substantially transparent inorganic high refractive index layer, such as ZnS.

Whatever arrangement is defined, it is advantageous if the individual regions allocated to the two different optical effects in FIGS. 14 and 15 are sufficiently large to facilitate clear visualisation of the effects.

The security devices shown in the previous figures are suitable to be applied as labels to secure documents which will typically require the application of a heat or pressure sensitive adhesive to the outer surface of the device which will contact the secure document. In addition an optional protective coating/varnish could be applied to the exposed outer surface of the device. The function of the protective coating/varnish is to increase the durability of the device during transfer onto the security substrate and in circulation.

In the case of a transfer element rather than a label the security device is preferably prefabricated on a carrier substrate and transferred to the substrate in a subsequent working step. The security device can be applied to the document using an adhesive layer. The adhesive layer is applied either to the security device or the surface of the secure document to which the device is to be applied. After transfer the carrier strip can be removed leaving the security device as the exposed layer or alternatively the carrier layer can remain as part of the structure acting as an outer protective layer. A suitable method for transferring security devices based on cast cure devices comprising micro-optical structures is described in EP1897700.

The security device of the current invention can also be incorporated as a security strip or thread. Security threads are now present in many of the world's currencies as well as vouchers, passports, travellers' cheques and other documents. In many cases the thread is provided in a partially embedded or windowed fashion where the thread appears to weave in and out of the paper. One method for producing paper with so-called windowed threads can be found in EP0059056. EP0860298 and WO03095188 describe different approaches for the embedding of wider partially exposed threads into a paper substrate. Wide threads, typically with a width of 2-6 mm, are particularly useful as the additional exposed area allows for better use of optically variable devices such as the current invention. The device structures shown in FIGS. 10 and 11 could be used as a thread by the application of a layer of transparent colourless adhesive to one or both of the outer surfaces of the device. Careful selection of the optical properties of the adhesive in contact with the microlenses is important. The adhesive must have a lower refractive index than the microlens material and the greater the difference in the refractive index between the microlenses and the adhesive the shorter the back focal length of the lenses and therefore the thinner the final security device.

The security device of the current invention can be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials.

Additional optically variable materials can be included in the security device such as thin film interference elements, liquid crystal material and photonic crystal materials. Such materials may be in the form of filmic layers or as pigmented materials suitable for application by printing.

The security device of the current invention may comprise an opaque layer.

Figure 16:
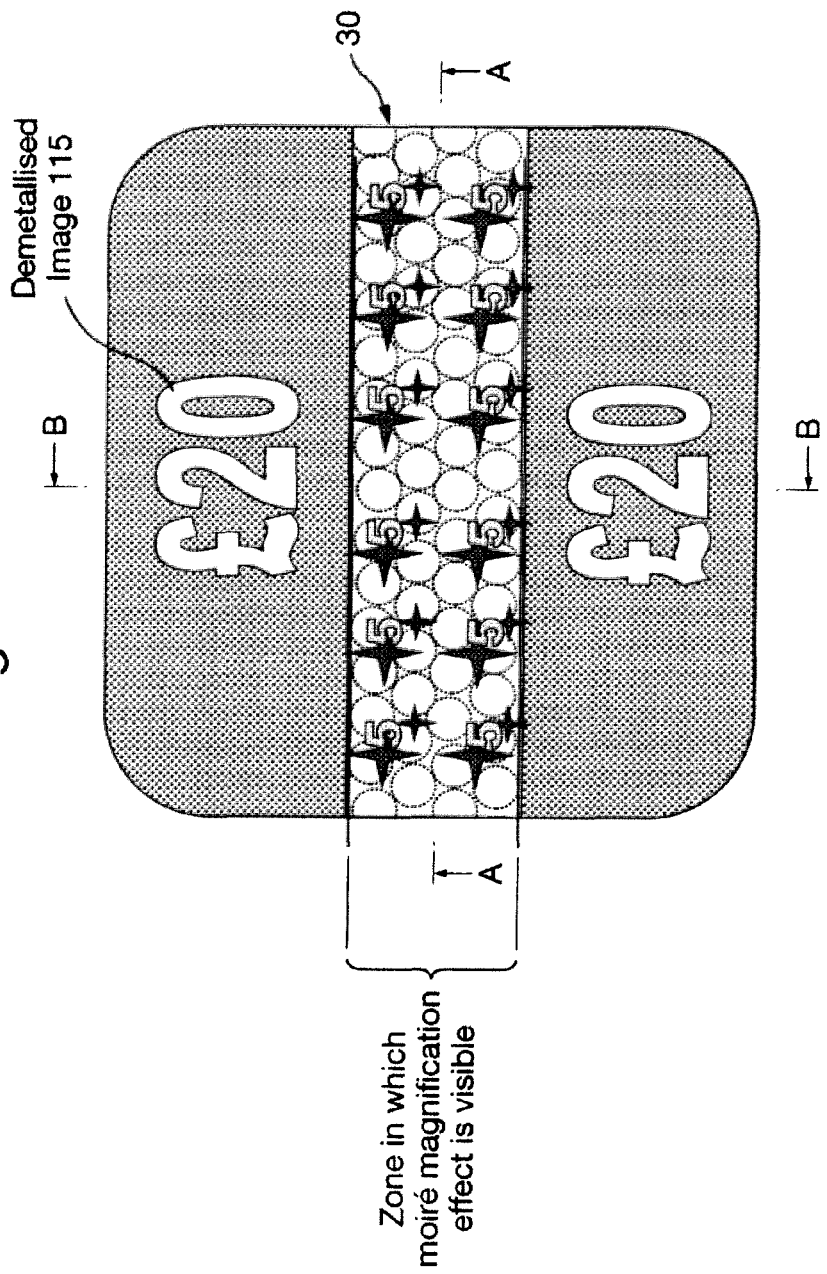
Figure 17:
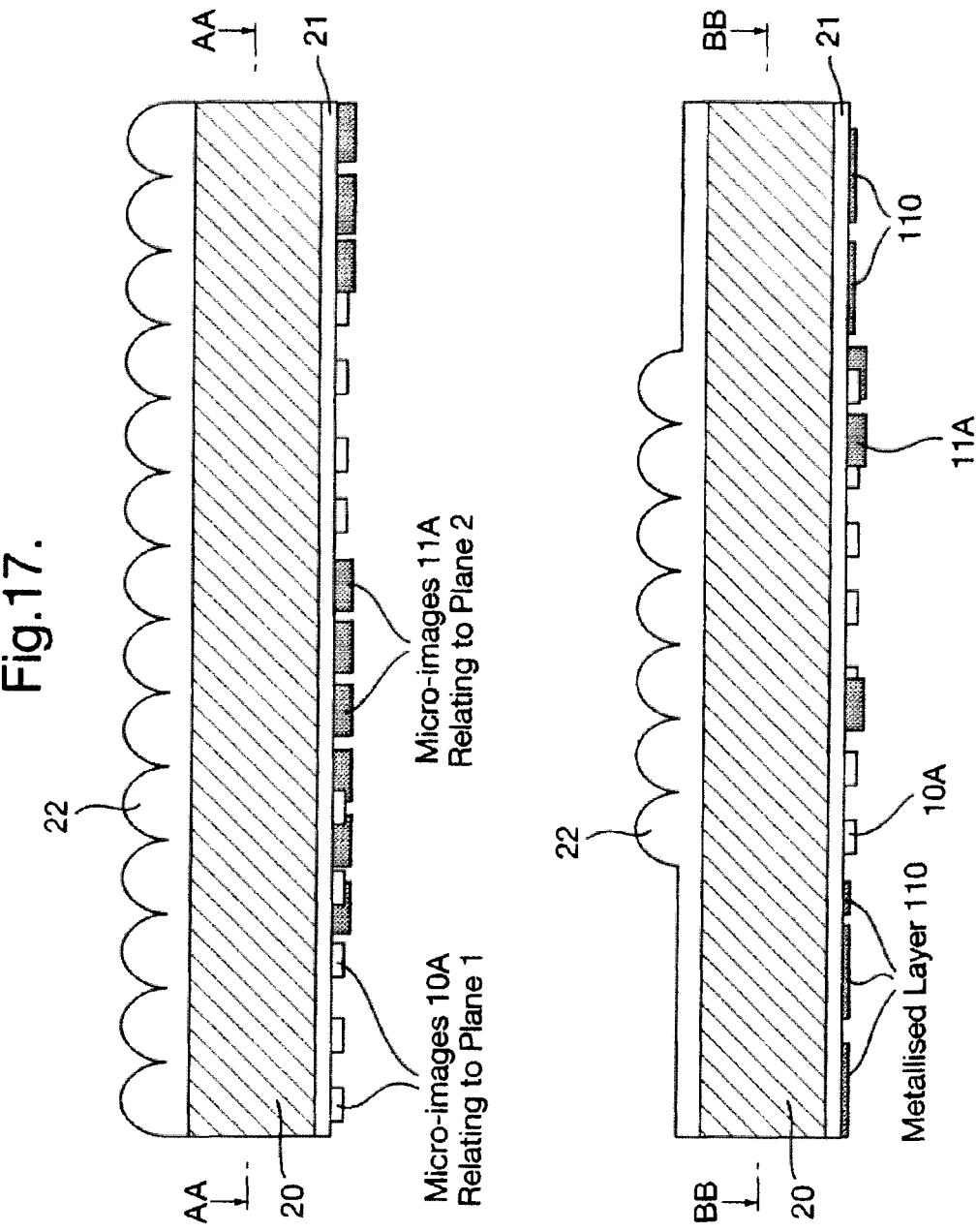
FIGS. 17a and 17b are sections along lines A-A and B-B respectively in FIG. 14; and, FIGS. 18, 19 and 20 illustrate further examples of the background image array and corresponding unit cells.

FIGS. 16 and 17 shows a further security feature in the form of a demetallised image incorporated within a security device of the current invention. The magnified image arrays of the device 30 are observed In the central band of the device. This provides a primary security effect due to the strong lenticular type animation. As can be seen in FIG. 17, the structure of the feature shown in FIG. 16 along section A-A is as shown in FIG. 10. In the regions outside of the central band exhibiting moiré magnification (as seen along section B-B) the print receptive layer 21 has been metallised 110. Parts 115 of the metal layer are demetallised to define the demetallised images thus enabling the creation of demetallised indicia which can be viewed in reflective but more preferably transmitted light.

In a further example and in reference to the mirror-based moiré example shown in FIG. 11 the metallised layer forming the micromirrors may be extended beyond the micormirrors and then parts of this layer can be demetallised to define demetallised images.

One way to produce partially metallised/demetallised films in which no metal is present in controlled and clearly defined areas, is to selectively demetallise regions using a resist and etch technique such as is described in U.S. Pat. No. 4,652, 015. Other techniques for achieving similar effects are for example aluminium can be vacuum deposited through a mask, or aluminium can be selectively removed from a composite strip of a plastic carrier and aluminium using an excimer laser. The metallic regions may be alternatively provided by printing a metal effect ink having a metallic appearance such as Metalstar® inks sold by Eckart.

The presence of a metallic layer can be used to conceal the presence of a machine readable dark magnetic layer. When a magnetic material is incorporated into the device the magnetic material can be applied in any design but common examples include the use of magnetic tramlines or the use of magnetic blocks to form a coded structure. Suitable magnetic materials include iron oxide pigments ($Fe_2O_3$ or $Fe_3O_4$), barium or strontium ferrites, iron, nickel, cobalt and alloys of these. In this context the term "alloy" includes materials such as Nickel:Cobalt. Iron:Aluminium:Nickel:Cobalt and the like. Flake Nickel materials can be used; in addition Iron flake materials are suitable. Typical nickel flakes have lateral dimensions in the range 5-50 microns and a thickness less than 2 microns. Typical iron flakes have lateral dimensions in the range 10-30 microns and a thickness less than 2 microns.

In an alternative machine-readable embodiment a transparent magnetic layer can be incorporated at any position within the device structure. Suitable transparent magnetic layers containing a distribution of particles of a magnetic material of a size and distributed in a concentration at which the magnetic layer remains transparent are described in WO03091953 and WO03091952.

In a further example the security device of the current invention may be incorporated in a security document such that the device is incorporated in a transparent region of the document. The security document may have a substrate formed from any conventional material including paper and polymer. Techniques are known in the art for forming transparent regions in each of these types of substrate. For example, WO8300659 describes a polymer banknote formed from a transparent substrate comprising an opacifying coating on both sides of the substrate. The opacifying coating is omitted in localised regions on both sides of the substrate to form a transparent region.

EP1141480 describes a method of making a transparent region in a paper substrate. Other methods for forming transparent regions in paper substrates are described in EP0723501, EP0724519, EP1398174 and WO03054297.

One or more of the microimage arrays of the present invention may be printed with inks comprising materials that respond visibly to invisible radiation. Luminescent materials are known to those skilled in the art to include materials having fluorescent or phosphorescent properties. It is also well known to use other materials that respond visibly to invisible radiation such as photochromic materials and thermochromic materials. For example only one of the magnified arrays might be visible in normal daylight conditions with the second magnified image becoming visible only under UV illumination. Alternatively the two magnified arrays could appear the same colour in normal daylight conditions and different colours when viewed using a filter or when viewed under UV illumination.

Referring to the example in FIG. 2 the second, background array 11 of stars could be printed in an ink that is invisible under normal lighting conditions but visible under UV illumination, in this case the magnified stars will only be observed under UV illumination. Alternatively either one or both of the first and second arrays 10, 11 could be printed in an ink that changes colour on exposure to UV radiation such that a change in colour of the magnified image is observed under UV radiation.

The invention claimed is:

1. A moiré magnification device comprising a transparent substrate carrying:
   i) a regular array of micro-focusing elements on a first surface, the focusing elements defining a focal plane;
   ii) a corresponding first array of microimage elements in a first colour and located in a plane substantially coincident with the focal plane of the focusing elements; and,
   a corresponding second array of microimage elements, in a second colour different from the first colour, and located in a plane substantially coincident with the focal plane of the focusing elements,
   wherein the pitches of the micro-focusing elements and first and second arrays of microimage elements and their relative locations are such that the array of micro-focusing elements cooperates with each of the first and second arrays of microimage elements to generate respective magnified versions of the microimage elements of each array due to the moiré effect and such that the magnified version of the first array of microimage elements is viewed against a background defined by the magnified version of the second array of microimage elements, the magnified version of the first array of microimage elements exhibiting movement relative to the background when the device is tilted, and wherein the pitch mismatch between the arrays is chosen such that the magnified version of the elements of the first array appears above or below the magnified version of the elements of the second array.

2. A device according to claim 1, wherein the micro-focusing elements comprise microlenses such as spherical lenslets, cylindrical lenslets, plano-convex lenslets, double convex lenslets, fresnel lenslets and fresnel zone plates.

3. A device according to claim 2, wherein each microlens has a diameter in the range 1-100 microns.

4. A device according to claim 1, wherein the micro-focusing elements comprise concave mirrors.

5. A device according to claim 1, wherein the magnified version of the first array of microimage elements appears in front of (or above) the magnified version of the second array of microimage elements.

6. A device according to claim 1, further comprising:
   iv) a corresponding third array of microimage elements, in a third colour different from the first and second colours, and located in the plane substantially aligned with the focal plane of the micro-focusing elements,
   wherein the pitches of the micro-focusing elements and third array of microimage elements are such that they cooperate to generate a magnified version of the image elements of the third array due to the moiré effect and such that the magnified version of the first array of microimage elements is viewed against a background defined by the magnified versions of the second and third arrays of microimage elements, the magnified version of the first array of microimage elements exhibiting movement relative to the background when the device is tilted.

7. A device according to claim 6, wherein the pitches of the array of micro-focusing elements and the first, second and third arrays of microimage elements are chosen such that the magnified version of the first array of microimage elements appears between the magnified versions of the microimage elements of the second and third arrays.

8. A device according to claim 6, wherein the pitches of the array of micro-focusing elements and first, second and third arrays of microimage elements are chosen so the magnified version of the image elements of the first array appear above the magnified versions of the image elements of the second and third arrays.

9. A device according to claim 1, wherein the microimage elements within at least one array are identical.

10. A device according to claim 1, wherein the microimage elements of each array differ from the microimage elements of each other array.

11. A device according to claim 1, wherein the microimage elements of the first array comprise icons such as symbols, geometric figures, alphanumeric characters, logos and pictorial representations.

12. A device according to claim 1, wherein the microimage elements of the second and/or third arrays define a respective generic, typically substantially uniform background.

13. A device according to claim 12, wherein the generic background is defined by a line pattern, for example parallel (straight) lines, simple geometric figures, or complex line structures such as guilloche patterns.

14. A device according to claim 1, wherein the microimage elements of the first, second and third arrays further differ from one another by one or more of shape, size and orientation.

15. A device according to claim 1, wherein the microimage elements are printed on the substrate.

16. A device according to claim 1, wherein the microimage elements are formed as grating structures, recesses or other relief patterns on the substrate.

17. A device according to claim 1 wherein the substrate comprises a polymer such as one of polyethylene teraphthalate (PET), polyamide, polycarbonate, polyvinylchloride (PVC), polyvinylidenechloride (PVdC), polymethylmethacrylate (PMMA), polyethylene naphthalate (PEN), and polypropylene.

18. A device according to claim 17, wherein the distance between the micro-focussing element array and the plane of the microimages is in the range 1-50 microns.

19. A device according to claim 1, further comprising a mask layer located underneath the arrays of microimage elements to provide a further background against which the magnified versions of the microimage elements are viewed.

20. A device according to claim 19, wherein the mask layer includes one or more of a reflective opacifying pigment and a fluorescent material.

21. A device according to claim 19, wherein the mask layer and one of the microimage arrays have overtly the same colour, but wherein one or other of the mask layer and microimage has been provided with a metameric property.

22. A security device according to claim 1.

23. A security device according to claim 22, further comprising one or more optically variable effect generating structures located adjacent or integrated with the moiré magnification device.

24. A device according to claim 22, formed as a security thread, label or patch.

25. A security device according to claim 22, the device being provided in a transparent window of a security document such as a banknote, identification card or the like.

26. An article provided with an optical device according to claim 1.

27. An article according to claim 26, wherein the article comprises one of a banknote, a cheque, a passport, identity card, certificate of authenticity, fiscal stamp and other document of security value or personal identity.

* * * * *